US012607840B2

(12) United States Patent
Wang et al.

(10) Patent No.: US 12,607,840 B2
(45) Date of Patent: Apr. 21, 2026

(54) OBJECTIVE LENS, OPTICAL IMAGING DEVICE, OPTICAL SYSTEM, AND TEST METHOD OF OPTICAL SYSTEM

(71) Applicant: XIAMEN UNIVERSITY, Xiamen (CN)

(72) Inventors: Hailong Wang, Xiamen (CN); Songyuan Ding, Xiamen (CN); Binbin Zhang, Xiamen (CN); Zhongqun Tian, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 523 days.

(21) Appl. No.: 18/022,839

(22) PCT Filed: Jul. 28, 2021

(86) PCT No.: PCT/CN2021/108972
§ 371 (c)(1),
(2) Date: Feb. 23, 2023

(87) PCT Pub. No.: WO2022/042189
PCT Pub. Date: Mar. 3, 2022

(65) Prior Publication Data
US 2024/0045193 A1 Feb. 8, 2024

(30) Foreign Application Priority Data

Aug. 27, 2020 (CN) .......................... 202010879955.4

(51) Int. Cl.
*G02B 21/04* (2006.01)
*G01N 21/64* (2006.01)
*G02B 21/00* (2006.01)

(52) U.S. Cl.
CPC ......... *G02B 21/04* (2013.01); *G02B 21/0032* (2013.01); *G02B 21/0076* (2013.01); *G01N 21/64* (2013.01)

(58) Field of Classification Search
CPC ................ G02B 21/04; G02B 21/0032; G02B 21/0076; G01N 21/64
(Continued)

(56) References Cited

U.S. PATENT DOCUMENTS 10,302,926 B2 * 5/2019 Pretorius ................ G02B 21/02
2003/0058530 A1 * 3/2003 Kawano ............... G02B 21/361
359/368
(Continued)

*Primary Examiner* — Sharrief I Broome
(74) *Attorney, Agent, or Firm* — Casimir Jones, S.C.; Tanya A. Arenson

(57) ABSTRACT

An objective lens, an optical imaging device, an optical system, and a test method of the optical system, relating to the field of optical testing. The purpose is to optimize the structure of the objective lens. The objective lens comprises a housing and an optical focusing assembly. The housing comprises a cavity, and the cavity is provided with a first opening and a second opening. The optical focusing assembly is mounted in the cavity, the focal point of the optical focusing assembly is located at the second opening, and the optical focusing assembly is configured to focus light entering the housing from the first opening a to the focal point. The optical focusing assembly in the objective lens focuses light on the basis of one of the reflection principle and the refraction principle.

18 Claims, 21 Drawing Sheets

(58) Field of Classification Search
USPC ........................................................ 359/726
See application file for complete search history.

(56) References Cited

U.S. PATENT DOCUMENTS

| | | | | |
|---|---|---|---|---|
| 2004/0246573 | A1* | 12/2004 | Tsuchiya | G02B 21/10 |
| | | | | 359/368 |
| 2010/0142038 | A1* | 6/2010 | Sugiura | G02B 5/3066 |
| | | | | 359/381 |
| 2016/0143517 | A1* | 5/2016 | Vance | A61B 1/00188 |
| | | | | 600/177 |

* cited by examiner

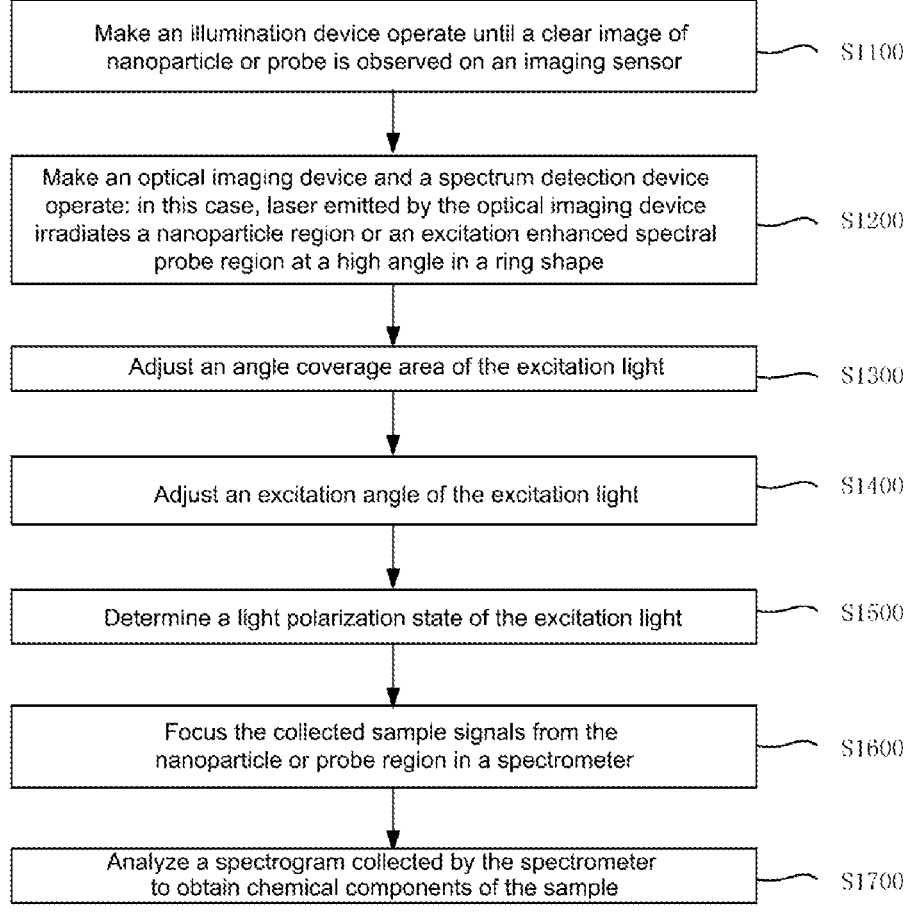

| | |
|---|---|
| Make an illumination device operate until a clear image of nanoparticle or probe is observed on an imaging sensor | S1100 |
| Make an optical imaging device and a spectrum detection device operate: in this case, laser emitted by the optical imaging device irradiates a nanoparticle region or an excitation enhanced spectral probe region at a high angle in a ring shape | S1200 |
| Adjust an angle coverage area of the excitation light | S1300 |
| Adjust an excitation angle of the excitation light | S1400 |
| Determine a light polarization state of the excitation light | S1500 |
| Focus the collected sample signals from the nanoparticle or probe region in a spectrometer | S1600 |
| Analyze a spectrogram collected by the spectrometer to obtain chemical components of the sample | S1700 |

Fig. 21b

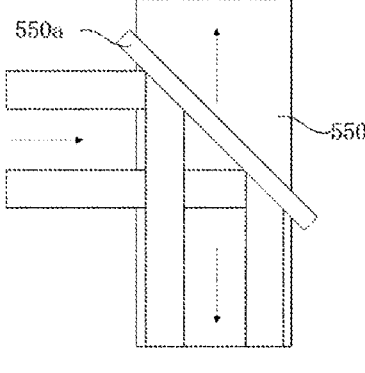

Fig. 22

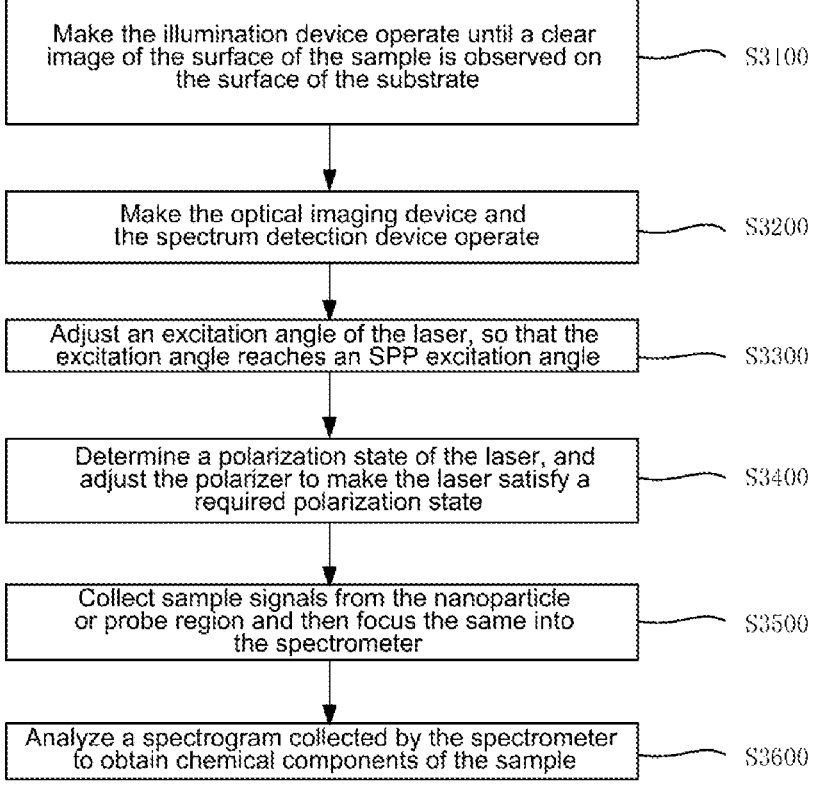

Make the illumination device operate until a clear image of the surface of the sample is observed on the surface of the substrate — S3100

Make the optical imaging device and the spectrum detection device operate — S3200

Adjust an excitation angle of the laser, so that the excitation angle reaches an SPP excitation angle — S3300

Determine a polarization state of the laser, and adjust the polarizer to make the laser satisfy a required polarization state — S3400

Collect sample signals from the nanoparticle or probe region and then focus the same into the spectrometer — S3500

Analyze a spectrogram collected by the spectrometer to obtain chemical components of the sample — S3600

Fig. 24

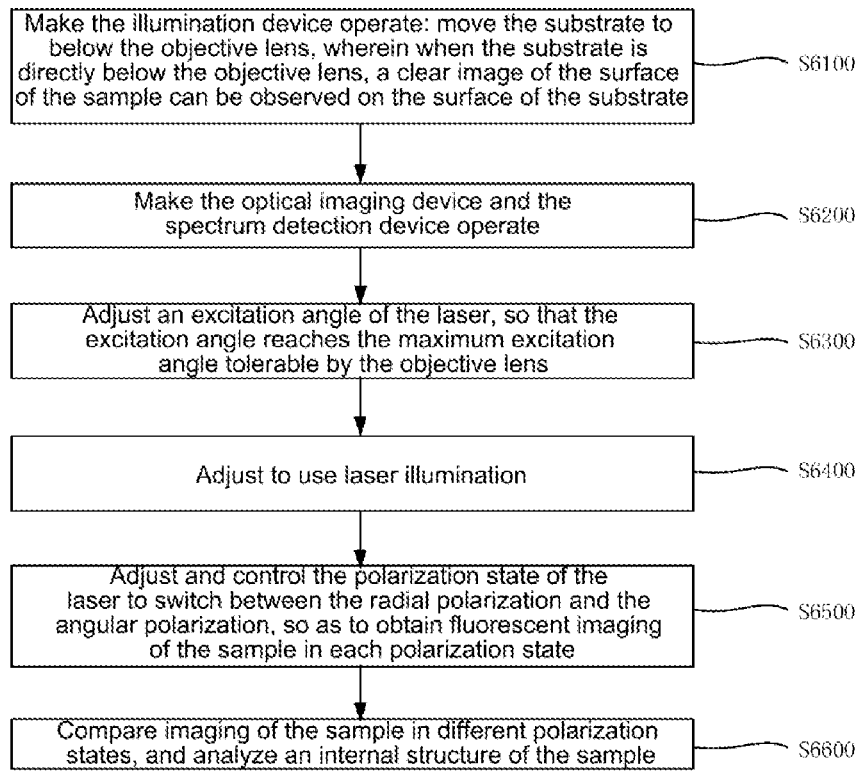

Make the illumination device operate: move the substrate to below the objective lens, wherein when the substrate is directly below the objective lens, a clear image of the surface of the sample can be observed on the surface of the substrate — S6100

Make the optical imaging device and the spectrum detection device operate — S6200

Adjust an excitation angle of the laser, so that the excitation angle reaches the maximum excitation angle tolerable by the objective lens — S6300

Adjust to use laser illumination — S6400

Adjust and control the polarization state of the laser to switch between the radial polarization and the angular polarization, so as to obtain fluorescent imaging of the sample in each polarization state — S6500

Compare imaging of the sample in different polarization states, and analyze an internal structure of the sample — S6600

Fig. 27b

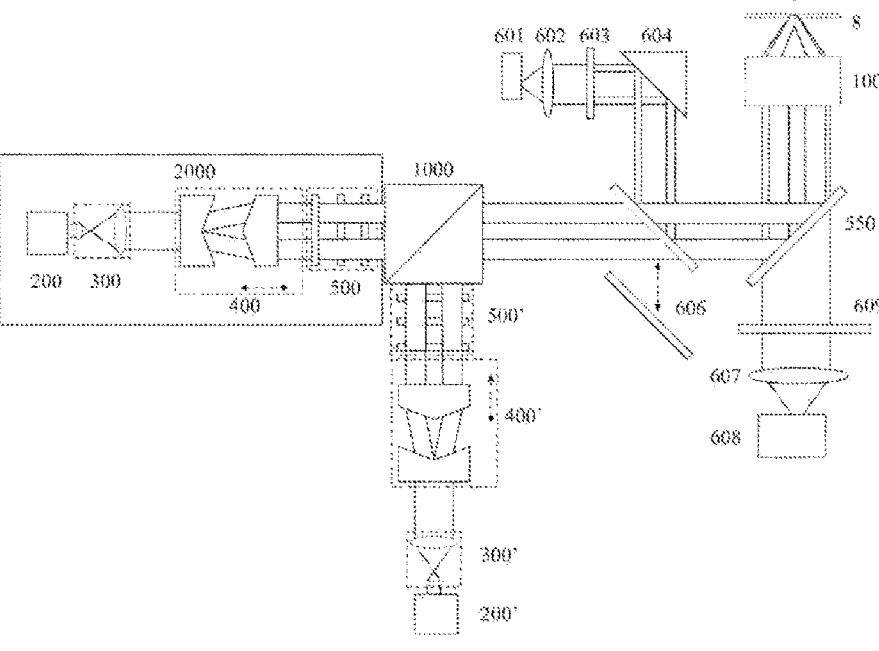

Fig. 28a

OBJECTIVE LENS, OPTICAL IMAGING DEVICE, OPTICAL SYSTEM, AND TEST METHOD OF OPTICAL SYSTEM

CROSS-REFERENCE TO RELATED APPLICATION

This application is a national phase application under 35 U.S.C. § 371 of PCT International Application No.: PCT/CN2021/108972, filed on Jul. 28, 2021, which claims the benefit of CN filing No. 202010879955.4 filed on Aug. 27, 2020, the contents of each of which are incorporated by reference herein.

TECHNICAL FIELD

The present disclosure relates to the technical field of optical spectra, and specifically relates to an objective lens, an optical imaging device, an optical system, and a detection method of an optical system.

BACKGROUND ART

Optical spectrum technologies, such as vibrational spectrum and fluorescence/photoluminescence spectrum, use an optical system to focus excitation beams in a sample region, and parse the physicochemical properties of samples by analyzing variation in frequency and intensity of scattered light (reflected or transmitted light) relative to excitation light. The optical spectrum detection technologies have advantages such as no damage to the samples, low environmental requirements, high sensitivity, and easiness in being carried in existing analysis devices to realize correlation functions, and have wide applications in production and life.

Linearly polarized vertical excitation of a sample is the most common way in optical spectrum technologies. For example, in the fields such as food hygiene detection and public safety detection, the sample is located on a flat substrate surface after pretreatment. A large number of sample molecules that are arranged in disorder on microscopic present uniform distribution on macroscopic, and such averaging effect reduces the sensitivity of the samples to an incident angle and a polarization state of excitation light. However, when the tested samples present periodic arrangement or an amount of the samples is decreased, the polarization state and the excitation angle of the excitation light gradually have significant influences on the spectrum, and bring adverse effects to the detection.

In the related art, the polarization state and the polarization angle of the optical detection device are determined, wherein when the polarization state and the polarization angle of the optical detection device are exactly consistent with the polarization state and the polarization angle required by the samples, the detection of the samples can be realized. However, the samples have different characteristics, and the required polarization states and polarization angles of excitation light are also different. All the optical detection devices in the related art only can detect specific samples.

The inventors found that there is an urgent need in the industry to research and develop an optical spectrum device that can be applied to detection of various samples with different characteristics.

SUMMARY

The present disclosure provides an objective lens, an optical imaging device, an optical system, and a detection method of an optical system, for optimizing the structure of the objective lens.

Some embodiments of the present disclosure provide an objective lens, including:

a housing, having an inner cavity (a cavity), wherein the inner cavity is provided with a first opening and a second opening; and an optical focusing assembly, mounted in the inner cavity, wherein a focal point of the optical focusing assembly is located at the second opening, the optical focusing assembly is configured to focus light entering the housing through the first opening on the focal point.

In some embodiments, the optical focusing assembly includes:

a lens group, including at least two lenses, wherein excitation light, after passing through the lenses, is focused on a same point outside the housing; and alternatively, the excitation light, after passing through respective lenses, is focused on a same point on a plane where the second opening is located.

In some embodiments, the respective lenses of the lens group are arranged in a row and concave surfaces of the respective lenses face a side where the focal point is located; and, along a direction toward the focal point, refractive indexes of the respective lenses are gradually increased.

In some embodiments, the lens group has at least one of the lenses, and at least one of the concave surface and a convex surface of the lens is a quadratic curved surface.

In some embodiments, the optical focusing assembly includes:

a metal plate, including a cambered surface, wherein the metal plate is integrated with the housing.

In some embodiments, a curvilinear function of the cambered surface satisfies a parabolic equation.

In some embodiments, the objective lens further includes:

a total reflection lens, mounted to the housing, wherein a sphere center of the total reflection lens is located on the focal point of the optical focusing assembly.

In some embodiments, the total reflection lens includes a hemispheric prism, a convex surface of the hemispherical prism is away from the side where the focal point is located, and a plane of the hemispherical prism faces the side where the focal point is located, and a plane of the total reflection lens is provided with an enhancement layer configured to excite a surface electromagnetic wave mode.

In some embodiments, the enhancement layer includes a first metal layer deposited on the plane of the total reflection lens or a two-dimensional material film layer prepared on the plane of the total reflection lens.

In some embodiments, a material of the first metal layer is selected from one or more of the group consisting of: gold, silver, copper, platinum, and palladium; and alternatively, a material of the two-dimensional material film layer is selected from one or more of the group consisting of: graphene, boron nitride, a transition metal chalcogenide, and a heterojunction composed of a transition metal chalcogenide.

In some embodiments, the total reflection lens includes a hemispherical prism, wherein a convex surface of the hemispherical prism is away from the side where the focal point is located, a plane of the hemispherical prism faces the side where the focal point is located, a semi-reflective and semi-transmissive film layer is deposited on a plane of the total reflection lens, and the semi-reflective and semi-transmissive film layer is configured to make a part of light reflected and make the remaining light transmitted, so as to form a surface total reflection on a surface of the semi-reflective and semi-transmissive film layer away from the housing.

In some embodiments, a material of the semi-reflective and semi-transmissive film layer is selected from one or more of the group consisting of: gold, silver, copper, aluminum, iron, platinum, palladium, and rhodium.

In some embodiments, the semi-reflective and semi-transmissive film layer has a thickness of 5 nanometers~50 nanometers.

In some embodiments, the total reflection lens uses a hemispherical prism, wherein a convex surface of the hemispherical prism is away from the side where the focal point is located, a plane of the hemispherical prism faces the side where the focal point is located, and a waveguide material layer is deposited on the plane of the total reflection lens.

In some embodiments, the waveguide material layer includes:

a second metal layer, deposited on the plane of the hemispherical prism; and a waveguide medium layer, deposited on a surface of the second metal layer away from the hemispherical prism.

In some embodiments, the objective lens further includes:

a bracket, wherein the bracket is fixedly connected to the housing, and the total reflection lens is mounted to the housing through the bracket.

In some embodiments, the total reflection lens includes:

a first lens portion, fixedly or detachably connected to the housing; and a second lens portion, detachably connected to the first lens portion, wherein a surface of the second lens portion away from the first lens portion is configured to support a sample.

In some embodiments, an angle of an excitation angle of the optical focusing assembly is 0°~85°.

In some embodiments, a coverage angle adjustment of the optical focusing assembly is 0.5°~5°.

In some embodiments, a clear aperture of the objective lens is 1.2 times-10 times a clear aperture of a microscopic objective lens.

Some other embodiments of the present disclosure provide an optical imaging device, including the objective lens provided in any one of the technical solutions of the present disclosure.

In some embodiments, the optical imaging device further includes:

a substrate, provided outside the housing, wherein the substrate is configured to dispose a sample to be detected.

The substrate is made of metal; and alternatively, a third metal layer or a two-dimensional material film layer is provided at a side of the substrate facing the housing.

A material of the third metal layer is selected from one or more of the group consisting of: gold, silver, copper, platinum, and palladium.

A material of the two-dimensional material film layer is selected from one or more of the group consisting of: graphene, boron nitride, a transition metal chalcogenide, and a heterojunction composed of a transition metal chalcogenide.

In some embodiments, the focal point of the optical focusing assembly is located on a surface of the substrate.

In some embodiments, the substrate is located outside the focal point of the optical focusing assembly.

In some embodiments, the substrate is located outside the focal point of the optical focusing assembly, and micro-nanospheres are sandwiched between the substrate and the total reflection lens of the optical focusing assembly.

In some embodiments, the optical imaging device further comprises: nanoparticles, deposited on the substrate, wherein the nanoparticles are located in a focal point region of the optical focusing assembly.

In some embodiments, the optical imaging device further includes:

a laser device, configured to emit laser; and a beam expander, provided upstream of the optical focusing assembly and located downstream of the laser device, so as to expand beam of light emitted by the laser device.

In some embodiments, the optical imaging device further includes:

a beam changer, including a first axicon and a second axicon, wherein a distance between the first axicon and the second axicon is adjustable; the first axicon is located between the beam changer and the second axicon, the first axicon includes an inwardly concave conical surface, the second axicon includes an outwardly convex conical surface, and the inwardly concave conical surface and the outwardly convex conical surface are arranged opposite to each other, and wherein the beam changer is configured to change a radius of light coming out through the beam expander.

In some embodiments, the optical imaging device further includes:

a polarizer, including a linear polaroid, a half-wave plate, and a spiral wave plate, wherein the half-wave plate is located between the linear polaroid and the spiral wave plate; the polarizer is located between the beam changer and the housing, and the polarizer is configured to adjust a polarization state of light coming out through the beam changer to one of the following: linear polarization, radial polarization, and angular polarization.

In some embodiments, the polarizer further includes:

a support member, wherein the linear polaroid, the half-wave plate, and the spiral wave plate are all rotatably mounted to the support member.

In some embodiments, the optical imaging device further includes:

a third reflecting mirror, including a dichroscope, wherein the dichroscope is located between the polarizer and the objective lens.

In some embodiments, a polarization direction of light output from the half-wave plate coincides with a fast axis of the spiral wave plate, and the polarizer outputs radially polarized light.

In some embodiments, the polarization direction of the light output from the half-wave plate is perpendicular to the fast axis of the spiral wave plate, and the polarizer outputs angularly polarized light.

In some embodiments, the optical system includes one of the following: an optical sectioning microscope and a two-photon microscope.

Some further embodiments of the present disclosure provide an optical system, including the optical imaging device provided in any one of the technical solutions of the present disclosure.

In some embodiments, the optical system further includes:

an illumination device, configured to provide visible illumination light; and/or a spectrum detection device, configured to collect scattered light of the sample under a laser excitation and analyze the same.

In some embodiments, the illumination device includes:
a visible light source, configured to emit visible light;
a lens, arranged between the visible light source and the objective lens; and
an annular baffle, arranged between the lens and the objective lens.

In some embodiments, the illumination device further includes:
a first reflecting mirror, arranged between the annular baffle and the objective lens;
a semi-reflective and semi-transmissive lens, arranged in parallel with a reflecting surface of the first reflecting mirror;
a second reflecting mirror, moveably arranged between the third reflecting mirror of the optical imaging device and the objective lens, wherein the second reflecting mirror is configured to switch between two following positions: being located on a light path between the third reflecting mirror and the objective lens to reflect light from the visible light source into the objective lens; and being located outside the light path between the third reflecting mirror and the objective lens, so as not to hinder propagation of light between the third reflecting mirror and the objective lens;
a first focusing mirror, located on a side of the semi-reflective and semi-transmissive lens away from the second reflecting mirror; and
an imaging sensor, located on a side of the first focusing mirror away from the semi-reflective and semi-transmissive lens.

In some embodiments, the optical system further includes:
a microscopic objective lens, configured to collect excitation images of the optical imaging device, wherein
the illumination device includes two illumination devices: a first illumination device and a second illumination device, wherein the first illumination device is configured to provide illumination for the optical imaging device so as to realize focusing of the objective lens of the optical imaging device, and the second illumination device is configured to provide illumination for the microscopic objective lens, so as to focus the microscopic objective lens.

In some embodiments, the optical system further includes an illumination device, wherein the illumination device is configured to provide visible illumination light, and wherein the illumination device includes:
a visible light source, configured to emit visible light;
a lens, arranged between the visible light source and the objective lens;
an annular baffle, arranged between the lens and the objective lens;
a first reflecting mirror, arranged between the annular baffle and the objective lens;
a second reflecting mirror, moveably arranged between the first reflecting mirror and the objective lens, wherein the second reflecting mirror is configured to switch between two following positions: being located on a light path between the first reflecting mirror and the objective lens to reflect light to the third reflecting mirror of the optical imaging device; and being located outside a light path between the polarizer of the optical imaging device and the objective lens, so as to avoid blocking light output by the polarizer from shooting to the third reflecting mirror;
a fluorescent microscope, arranged on a side of the third reflecting mirror away from the objective lens;

a first focusing mirror, located on a side of the fluorescent microscope away from the third reflecting mirror; and
an imaging sensor, located on a side of the first focusing mirror away from the fluorescent microscope.

In some embodiments, two sets of optical imaging devices are included, wherein focal points of the two sets of optical imaging devices coincide; and at least one set of the optical imaging devices is mounted to a delay line, so that a light path difference of laser emitted by the two sets of optical imaging devices is adjustable.

In some embodiments, the optical system further includes:
a beam combiner, configured to couple two paths of excitation light emitted from the two sets of optical imaging devices into one path.

Some further embodiments of the present disclosure provide a detection method of an optical system, implemented by using the optical system provided in any one of the technical solutions in the present disclosure, wherein the detection method of an optical system includes steps of:
enabling an illumination device, and adjusting an objective lens of the optical imaging device so as to realize focusing;
adjusting a polarization state, an excitation angle, and a coverage angle adjustment area of a laser light path of the optical imaging device, and making characteristics of the excitation light satisfy excitation requirements of the sample; and
collecting an image of the sample under a laser excitation and analyzing the same.

In some embodiments, making characteristics of the excitation light satisfy excitation requirements of the sample includes a step of:
determining to use one of the following excitation modes according to the excitation requirements of the sample: an annular vector polarized excitation mode, an annular vector polarized excitation total reflection mode, an annular vector polarized excitation KR-SPP mode, an annular vector polarized excitation Otto-SPP mode, an annular vector polarized excitation planar waveguide mode, an annular vector polarized excitation optical sectioning microscope mode, and an annular vector polarized excitation sectioning two-photon microscope mode.

In some embodiments, in the annular vector polarized excitation mode, a polarization state of the excitation light is adjusted to one of the following: radial polarization, angular polarization, and linear polarization.

In some embodiments, in the annular vector polarized excitation total reflection mode, the polarization state of the excitation light is adjusted to one of the following: radial polarization and angular polarization.

In some embodiments, in the annular vector polarized excitation KR-SPP mode, the polarization state of the excitation light is adjusted to radial polarization.

In some embodiments, in the annular vector polarized excitation Otto-SPP mode, the polarization state of the excitation light is adjusted to radial polarization.

In some embodiments, in the annular vector polarized excitation planar waveguide mode, the polarization state of the excitation light is adjusted to one of the following: radial polarization, angular polarization, and linear polarization.

In some embodiments, in the annular vector polarized excitation optical sectioning microscope mode, the polarization state of the excitation light is adjusted to one of the following: radial polarization and angular polarization.

In some embodiments, in the annular vector polarized excitation sectioning two-photon microscope mode, the polarization state of the excitation light is adjusted to one of the following: radial polarization and angular polarization The objective lens provided in the above technical solutions has the housing and the optical focusing assembly, wherein the optical focusing assembly realizes light focusing on the basis of one of the reflection principle and the refraction principle, wherein when the excitation angle of the sample is within the range of 0°~85°, the optical focusing assembly can realize focusing, therefore, it can be suitable for different optical detection requirements, with a quite wide application range.

BRIEF DESCRIPTION OF DRAWINGS

FIG. 4b is an enlarged schematic diagram of the total reflection lens in FIG. 4a;

FIG. 6b is an enlarged schematic diagram of the total reflection lens in FIG. 6a;

FIG. 7b is an enlarged schematic diagram of the total reflection lens in FIG. 7a;

FIG. 8b is an enlarged schematic diagram of the total reflection lens in FIG. 8a;

FIG. 21b is a schematic flow chart of optical detection performed using the optical system shown in FIG. 21a in an annular vector polarized excitation particle or annular excitation enhanced probe mode;

FIG. 22 is a schematic diagram of principle of a dichroscope of an optical imaging device provided in some further embodiments of the present disclosure;

FIG. 24 is a schematic flow chart of a detection method in an annular vector polarized excitation KR-SPP mode provided in some other embodiments of the present disclosure;

FIG. 27b is a schematic flow chart of an optical detection method in an annular vector polarized excitation optical sectioning microscope mode provided in some other embodiments of the present disclosure;

FIG. 28a is a schematic diagram of principle of an optical system realizing an annular vector polarized excitation optical sectioning microscope mode provided in some other embodiments of the present disclosure.

DETAILED DESCRIPTION OF EMBODIMENTS

The technical solutions provided in the present disclosure are illustrated in more detail below with reference to FIG. 1-FIG. 28b.

Nouns and terms used herein are interpreted.

Optical spectrum technologies, such as vibrational spectrum and fluorescence/photoluminescence spectrum, refers to using the optical systems to focus excitation beams in a sample region and parsing the physicochemical properties of samples by analyzing variation in frequency, intensity and the like of scattered light (reflected or transmitted light) relative to excitation light. The optical spectrum detection technologies have the advantages such as no damage to the samples, low environmental requirements, high sensitivity, and easiness in being carried in existing analysis devices to realize correlation functions, and have wide applications in production and life.

Polarization states include linear polarization, elliptical polarization, circular polarization, and vector polarization. In the above, the vector polarization includes radial polarization, angular polarization, and the like. In the field of optical spectrum detection, the polarization states mainly used are linear polarization, radial polarization, and angular polarization. The inventors found that the polarization state and the excitation angle directly affect the optical spectrum characteristics. For example, in Surface-Enhanced Raman Scattering (SERS) spectroscopy, single-molecule level detection can be realized by optimizing the polarization state and the excitation angle.

Figure 1:
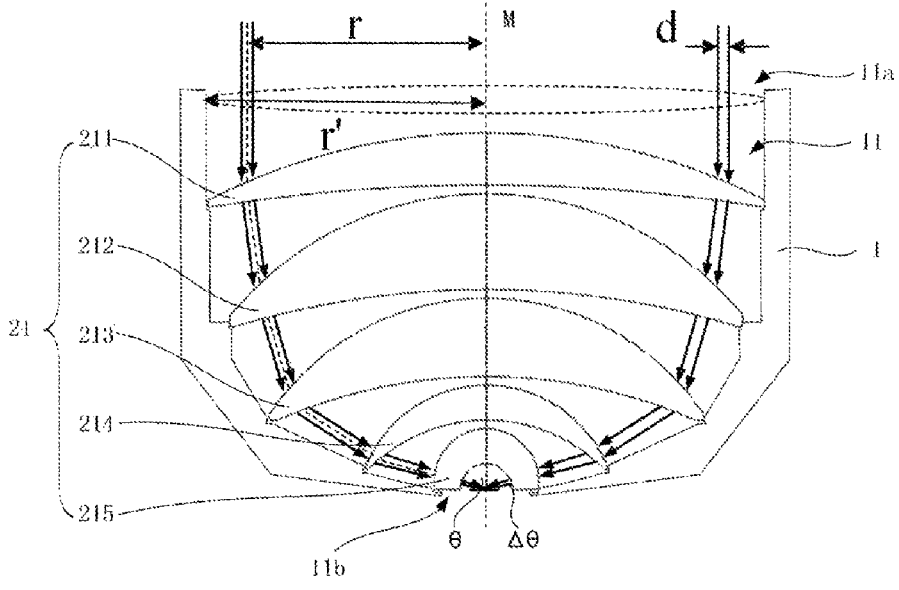
FIG. 1 is a structural schematic diagram of a refraction-type objective lens provided in some embodiments of the present disclosure.

Referring to FIG. 1, an embodiment of the present disclosure provides an objective lens 100, applicable to optical spectrum detection. This objective lens 100 includes a housing 1 and an optical focusing assembly 2. The housing 1 has a inner cavity 11, and the inner cavity 11 is provided with a first opening 11a and a second opening 11b. The optical focusing assembly 2 is mounted in the inner cavity 11, and a focal point of the optical focusing assembly 2 is located at the second opening 11b. The focal point of the optical focusing assembly 2 can be located outside or inside the housing 1 or located on a plane where an outermost side of the second opening 11b is located. All of the above configuration manners can satisfy subsequent detection requirements. The optical focusing assembly 2 is configured to focus light entering the housing 1 through the first opening 11a on the focal point.

Figure 9:
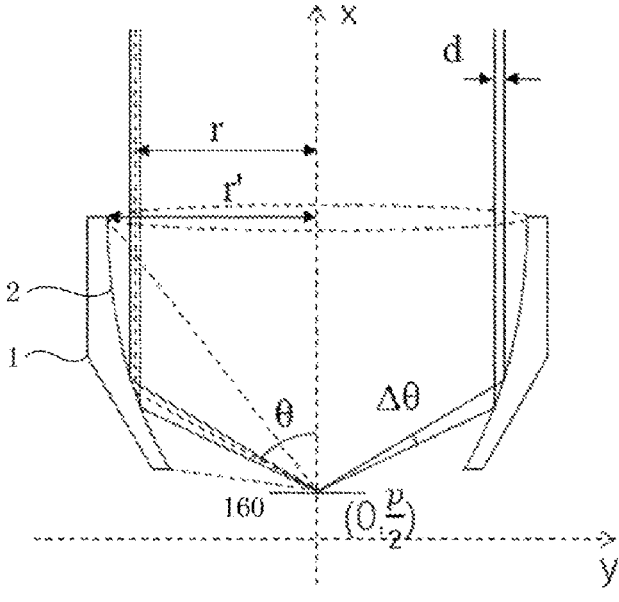
FIG. 9 is a structural schematic diagram of a reflection-type objective lens provided in some further embodiments of the present disclosure.
Figure 14A:
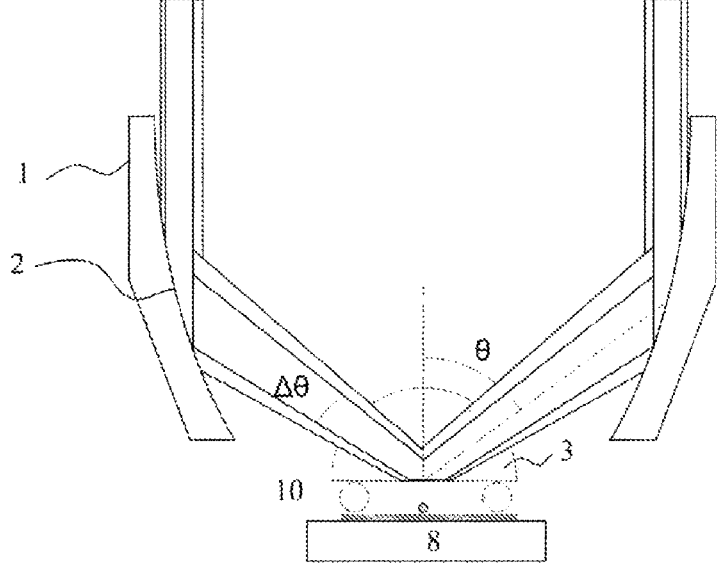
FIG. 14a is a structural schematic diagram of a reflection-type objective lens of an optical imaging device, with micro-nanospheres being sandwiched between a substrate and a total reflection lens, provided in some embodiments of the present disclosure.

Dimensions of inner diameters of the first opening 11a and the second opening 11b of the inner cavity 11 can be set as desired by adjusting excitation angle $\theta$ and an angle coverage area $\Delta\theta$. The so-called excitation angle $\theta$ refers to an included angle, after a light beam passing through the optical focusing assembly 2, between a central line of the light beam and an optical axis of the objective lens 100, as shown in FIG. 1, FIG. 9, FIG. 14a, and other drawings. The so-called coverage angle adjustment area $\Delta\theta$ refers to: a difference, after a light passes through the optical focusing assembly 2, between an included angle between an inner side edge of the light and optical axis M of the objective lens 100 and an included angle between an outer side edge of the light and the optical axis M of the objective lens 100. The dimension of the inner diameter of the first opening 11a of the inner cavity 11 may be set to be much larger than that of a commonly used microscope imaging objective lens, i.e., a microscopic objective lens 800, for example, the dimension of the inner diameter of the inner cavity 11 is 1.2~10 times, specifically, 1.2 times, 1.4 times, 1.6 times, 3 times, 5 times, 6 times, 7 times, 8 times, 9 times, and 10 times, of the dimension of the inner diameter of a clear aperture of the microscopic objective lens 800.

The optical focusing assembly 2 can focus light to a set position outside the housing 1 based on the reflection principle (the objective lens 100 is structured as a parabolic reflection-type objective lens 100) and the refraction principle (the objective lens 100 is structured as a refraction-type objective lens 100). It will be described respectively later.

In some embodiments, the excitation angle of the optical focusing assembly 2 has an angle of 0°~85° The optical focusing assembly 2 has a particularly large range of excitation angle, and can be adapted to excitation light with various excitation angles, thus greatly improving an application range of the objective lens 100.

In some embodiments, the optical focusing assembly 2 has a coverage angle adjustment area $\Delta\theta$ of 0.5°~5°, as shown in FIG. 1 and FIG. 9. FIG. 9 more clearly shows positions of the excitation angle $\theta$ and the coverage angle adjustment area $\Delta\theta$. The coverage angle area $\Delta\theta$ can be adjusted to be quite small, so that the excitation light can be adjusted with high precision, even stepless adjustment can be realized, which implements that excitation light requiring various different coverage angle adjustment areas can be precisely adjusted.

There are multiple implementation modes for the optical focusing assembly 2, which will be classified and described in detail below.

Referring to FIG. 1, in some embodiments, the optical focusing assembly 2 includes a lens group 21, and the lens group 21 includes at least two lenses. The housing 1 is provided with a plurality of steps therein, and each lens is fixed on one of the steps. The focal point of the lens group 21 is focused on a point outside the housing 1. In these embodiments, the optical focusing element 2 focuses light according to the refraction principle of light, and is therefore also called as a refraction-type objective lens 100. Referring to FIG. 1, in the embodiment where the optical focusing assembly 2 uses the lens group 21, the clear aperture r' of the refraction-type objective lens 100 is greater than 20 mm, for example, specifically 30 mm. In those embodiments without a total reflection lens 3 described later, the focal point of the optical focusing assembly 2 of the refraction-type objective lens 100 is located at a sphere center of a concave surface of a fifth lens 215 described later. In various embodiments with the total reflection lens 3 described later, in a total internal reflection operation mode of the refraction-type objective lens 100, a hemispherical prism can be arranged in a space enclosed by the fifth lens 215 described later.

In this case, it can be realized through the lens group 21 that the excitation angle θ of incident light from a last lens (e.g. the fifth lens 215 in lens group of five 21, and a fourth lens 214 in lens group of four 21 described later) can be up to 80°. A wall thickness d of annular light beam can be controlled, by a beam expander 300 and a beam changer 400 which are described later, to be 0.4 mm at the minimum, and in this case, the excitation angle coverage area Δθ of the most marginal light focused on the sample is not more than 2°, and the adjustment precision is very high.

Referring to FIG. 1, respective lenses of the lens group 21 are arranged in a row and concave surfaces of respective lenses face the side where the focal point is located, and, along a direction toward the focal point: refractive indexes of respective lenses are gradually increased, and Abbe numbers of respective lenses are complementary. In the embodiment shown in FIG. 1, the lens group 21 includes five lenses, which are: a first lens 211, a second lens 212, a third lens 213, a fourth lens 214, and the fifth lens 215, respectively, along a direction of light incidence. Distances of the five lenses along an optical axis direction are set as required. The refractive index of the first lens 211 is the lowest, and the Abbe number of the first lens 211 is the highest. The refractive index of the fifth lens 215 is the highest, and the Abbe number of the fifth lens 215 is relatively low. In some embodiments, from the first lens 211 to the fifth lens 215, the refractive index is increased from 1.4 to 1.9, and the Abbe number presents a decreasing trend from 70 to 25. By controlling curvature radii of the five lenses, the lens group 21 can be allowed to have an excellent achromatic power. The above configuration manner realizes that light is effectively gathered at a set focal point, so as to facilitate the optical detection subsequently.

Referring to FIG. 1, in some embodiments, the lens group 21 has at least one lens, and at least one of a concave surface and a convex surface of the lens is a quadratic curved surface. Specifically, all convex surfaces and concave surfaces may be selected to be quadratic curved surfaces, so as to effectively reduce spherical aberration of the refraction-type objective lens 100. The quadric curved surface satisfies the following formula:

$$z = \frac{ch^2}{1 + \sqrt{1 - (1 + k)c^2h^2}} \qquad \text{Formula (1)}$$

In the above formula (1), c is a reciprocal of curvature radius of the lens surface, h is a distance from a point on the lens surface to a vertex of the lens surface (namely, vertex of the curved surface where the lens surface is located), and k is a constant of the quadric curved surface.

Figure 2:
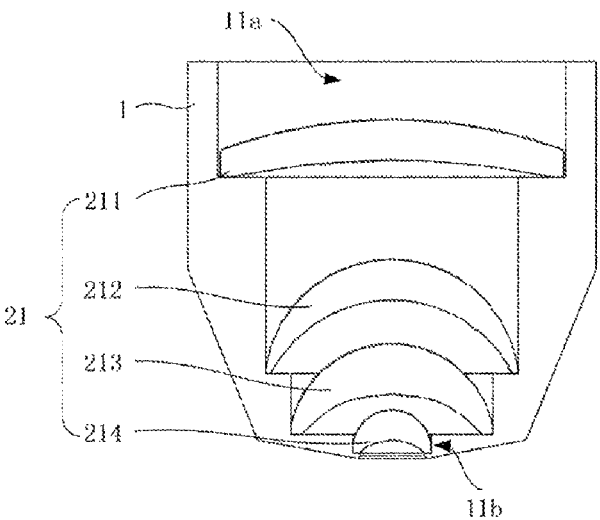
FIG. 2 is a structural schematic diagram of a refraction-type objective lens provided in some other embodiments of the present disclosure.

Referring to FIG. 2, an implementation in which the lens group 21 uses four lenses is given below.

In the situation as shown in FIG. 2, the lens group 21 includes four lenses, which are: a first lens 211, a second lens 212, a third lens 213, and a fourth lens 214, respectively, along the direction of light incidence. The refractive index of the first lens 211 is the lowest, and the refractive index of the fourth lens 211 is the highest. For the first lens 211, the second lens 212, the third lens 213, and the fourth lens 214, the refractive indexes are 1.5~2, the Abbe numbers are 20~60, and the curvature radii are 2~50. The lens group 21 uses four lenses, thus reducing an incident aperture, and reducing the processing difficulty. With the above configuration manner, light is effectively gathered at a set focal point, so as to facilitate the optical detection subsequently.

Formulas of quadratic curved surface of the lens group 21 composed of the four lenses are as follows:

$$z = \frac{ch^2}{1 + \sqrt{1 - (1 + k)c^2h^2}} \qquad \text{Formula (2)}$$

$$c = \frac{1}{r} \qquad \text{Formula (3)}$$

$$h^2 = x^2 + y^2 \qquad \text{Formula (4)}$$

In the above formulas (2)~(4), c is a reciprocal of curvature radius of the lens surface; k is a constant of the quadric curved surface; h is a distance from a point on the curved surface to a vertex of the lens surface; and x and y are coordinates of a point on the curved surface relative to the vertex of the lens surface.

Figure 3:
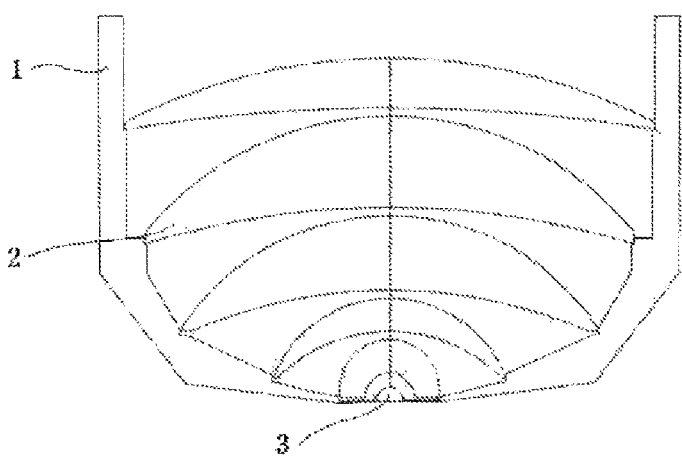
FIG. 3 is a structural schematic diagram of a refraction-type objective lens, with a total reflection lens, provided in some further embodiments of the present disclosure.
Figure 4A:
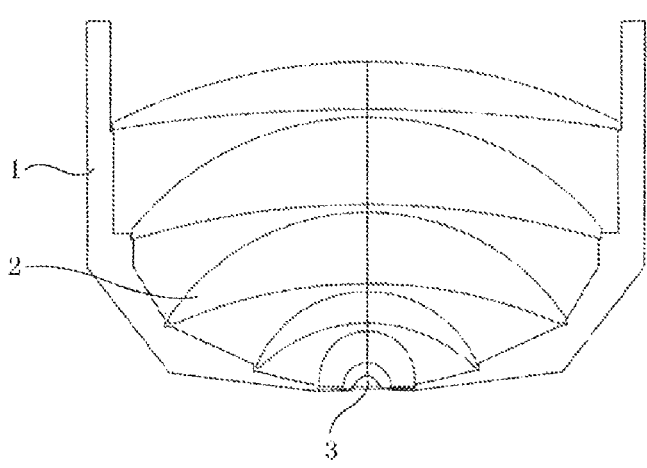
FIG. 4a is a structural schematic diagram of a total reflection lens of a refraction-type objective lens, with an enhancement layer (with a first metal layer), provided in some embodiments of the present disclosure.
Figure 4B:
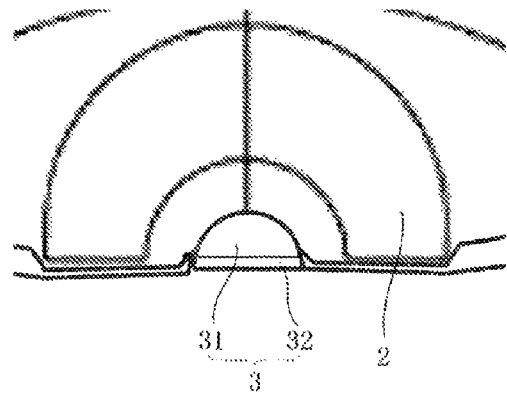

Referring to FIG. 3 to FIG. 4b, in some embodiments, the objective lens 100 further includes a total reflection lens 3, and the total reflection lens 3 is mounted to the housing 1. A sphere center of the total reflection lens 3 is located on the focal point of the optical focusing assembly 2. At the total reflection lens 3, light is totally internally reflected. In various embodiments with the total reflection lens 3, a distance from a surface of a sample 900 to a plane of the total reflection lens 3 is less than 20 microns.

Referring to FIG. 3, in some embodiments, the total reflection lens 3 includes a hemispheric prism, and the hemispheric prism is in an integral structure or in a pieced structure. A planar side of the hemispherical prism is located on a focal plane of the objective lens 100. A refractive index of the hemispherical prism ranges 1.40~1.99. The above technical solution, in which the total reflection lens 3 is added, and light is totally reflected in the total reflection lens 3, is particularly suitable for products requiring optical detection in the total reflection mode.

The objective lens 100 provided in various embodiments of the present disclosure can realize an annular vector polarized excitation total reflection mode, and is particularly suitable for optical detection in a molecular level, in which an object to be detected has a too small dimension and is difficult to observe by naked eyes. The sample 900 to be detected is directly deposited or adsorbed on a plane of the total reflection lens 3. When different samples need to be detected, the total reflection lens 3 is directly replaced. An optical detection method will be described in detail below in conjunction with a light path where the objective lens 100 is located.

Referring to FIG. 4a to FIG. 4b, in some other embodiments, the total reflection lens 3 includes a first lens portion 31 and a second lens portion 32. The first lens portion 31 is fixedly or detachably connected to the housing 1. The second lens portion 32 is detachably connected to the first lens portion 31, and a surface of the second lens portion 32 away from the first lens portion 31 is configured to dispose the sample. After mounting, a gap between the second lens portion 32 and the first lens portion 31 is filled with a refractive index coupling solution. The plane of the total reflection lens 3 is a surface of the second lens portion 32 away from the first lens portion 31. A cambered surface of the total reflection lens 3 is a cambered surface of the first lens portion 31 away from the second lens portion 32.

The objective lens 100 provided in various embodiments of the present disclosure can realize the annular vector polarized excitation total reflection mode, and is particularly suitable for optical detection in a molecular level, in which an object to be detected has a very small dimension and is difficult to observe by naked eyes. The sample 900 to be detected is directly deposited or adsorbed on a plane of the second lens portion 32, wherein when different samples need to be detected, the second lens portion 32 is directly replaced, which can simplify the detection operation. The optical detection method will be described in detail below in conjunction with the light path in which the objective lens 100 is located.

Figure 5A:
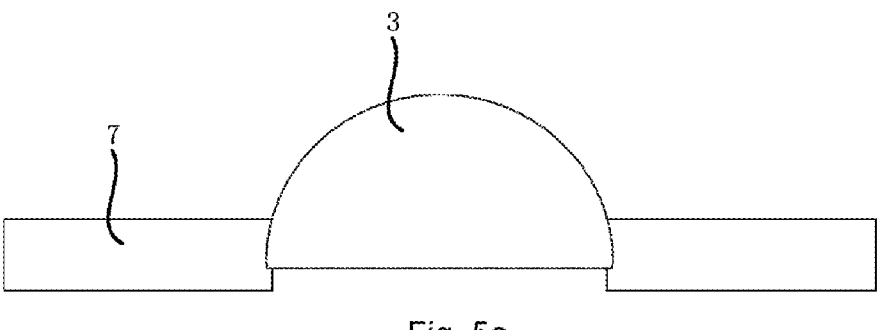
FIG. 5a is a fixing schematic diagram of the total reflection lens of the objective lens provided in some embodiments of the present disclosure.
Figure 5B:
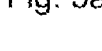
FIG. 5b is a fixing schematic diagram of the total reflection lens of the objective lens provided in some other embodiments of the present disclosure.

Referring to FIG. 5a and FIG. 5b, in various embodiments introduced above, in order to facilitate mounting the total reflection lens 3, the objective lens 100 further includes a bracket 7, the bracket 7 and the housing 1 are fixedly connected, and the fixed connection specifically may be welded, adhered, integrated, and detachable connection. The detachable connection specifically is, for example, snap-fit connection, a threaded connection, or the like. The total reflection lens 3 is mounted to the bracket 7. Depending on the use state, the position where the total reflection lens 3 is located is different, and in the case illustrated in FIG. 4b, the total reflection lens 3 is located below the optical focusing assembly 2. In this case, the bracket 7 is provided with a step, on which the total reflection lens 3 is placed, with reference to FIG. 5a. In the case shown in FIG. 15a and FIG. 15b below, the total reflection lens 3 is located above the optical focusing assembly 2. In this case, the bracket 7 is provided with a step and a clamping portion, and the total reflection lens 3 is placed on the step and is held by the clamping portion, as shown in FIG. 5b.

In spectrum detection, by placing a sample at the focal point of the objective lens 100, the sample can be effectively excited, and a spectral signal that needs to be detected is produced. In the total internal reflection operation mode, the sample is directly adhered to a sphere center of the hemispherical prism, and the center of the hemispherical prism coincides with the focal point of the objective lens 100. Besides, in the total internal reflection mode of the objective lens 100, the sample also may be disposed at a certain distance from the sphere center of the total internal reflection lens 3, then relatively high excitation efficiency also can be obtained. The distance from the sample to the surface of total reflection lens 3 is generally not more than 20 micrometers.

In the technical solutions provided in various embodiments of the present disclosure, the total reflection lens 3 is used to improve excitation efficiency of excitation light, and energies of excitation beams are concentrated in an annular light beam ring with an extremely narrow wall thickness. By controlling the light beam polarization, the excitation angle and the excitation angle coverage area can be flexibly controlled according to characteristics of the sample. The present disclosure is particularly suitable for applications having particular requirements on the excitation angle and polarization, such as shell-isolated nanoparticle-enhanced spectrum, single-particle-enhanced spectrum, and probe-enhanced spectrum and other fields, and effectively improves the sensitivity of spectrum detection. In addition, the above technical solution reduces the angle control capability achieved by a conventional large and complex corner device in a highly integrated optical device, greatly simplifies the device structure, and can be directly applied to an existing microscopic spectral system.

Figure 6A:
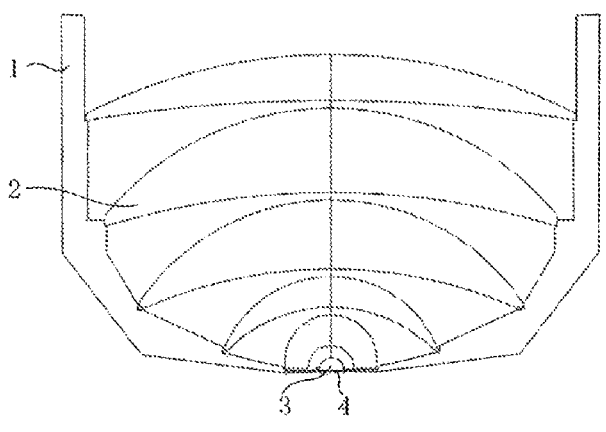
FIG. 6a is a structural schematic diagram of a refraction-type objective lens provided in some further embodiments of the present disclosure.
Figure 6B:
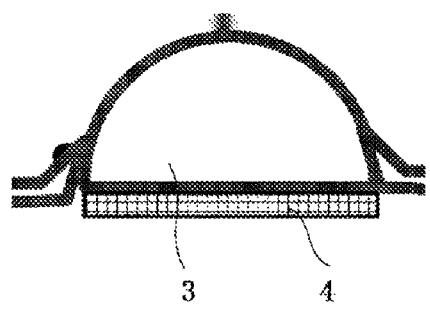

Referring to FIG. 6a and FIG. 6b, some other embodiments of the objective lens 100 are described below. In these embodiments, the objective lens 100 has not only the total reflection lens 3, but also an enhancement layer 4 which improves the excitation efficiency.

Referring to FIG. 6a to FIG. 6b, in some embodiments, the total reflection lens 3 includes a hemispherical prism, wherein a cambered surface of the hemispherical prism faces the housing 1, and a plane of the total reflection lens 3 is provided with the enhancement layer 4. The enhancement layer 4 is configured to excite a surface electromagnetic wave mode.

The enhancement layer 4 is, for example, a first metal layer deposited on the plane of the total reflection lens 3 or a two-dimensional material film layer prepared on the plane of the total reflection lens 3.

In some embodiments, the material of the first metal layer is selected from one or more of the group consisting of: gold, silver, copper, platinum, and palladium. By providing the first metal layer, a support metal layer may be provided for propagation of surface electromagnetic field.

In some other embodiments, the material of the two-dimensional material film layer is selected from one or more of the group consisting of: graphene, boron nitride, a transition metal chalcogenide, and a heterojunction composed of a transition metal chalcogenide. The heterojunction thickness is 0.2 nanometers~50 nanometers. By providing the two-dimensional material film, a support material layer can be provided for propagation of surface electromagnetic field.

Figure 7A:
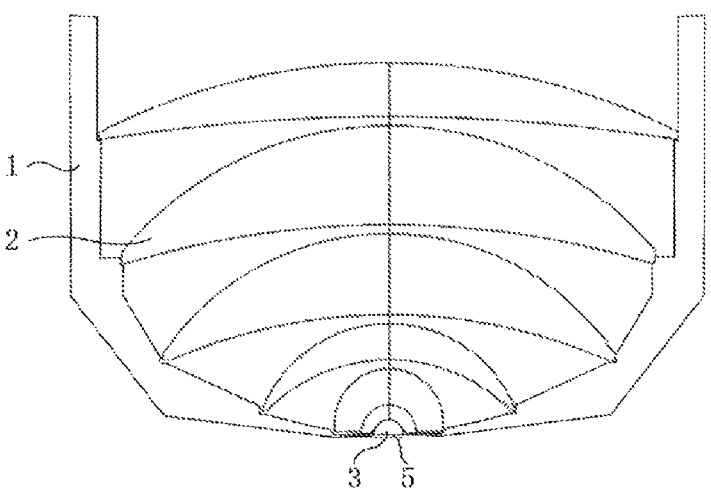
FIG. 7a is a structural schematic diagram of a refraction-type objective lens, with a semi-transmissive and semi-reflective layer, provided in some further embodiments of the present disclosure.
Figure 7B:
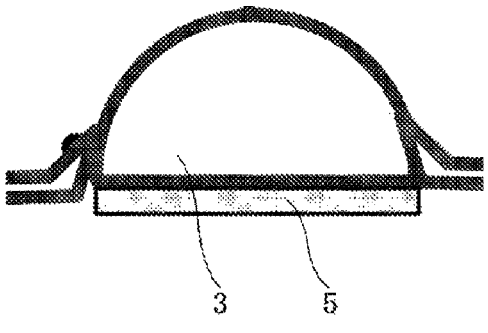

Referring to FIG. 7a and FIG. 7b, according to different requirements of different optical detection, in some other embodiments, the total reflection lens 3 is a hemispherical prism, a convex surface of the hemispherical prism is away from the side where the focal point is located, and the plane of the hemispherical prism faces the side where the focal point is located, wherein a semi-reflective and semi-transmissive film layer 5 is deposited on a plane of the total reflection lens 3, and the semi-reflective and semi-transmissive film layer 5 is configured to make a part of light reflected and make the remaining light transmitted, so as to form surface total reflection on the surface of the semi-reflective and semi-transmissive film layer 5 away from the housing 1.

Referring to FIG. 7a and FIG. 7b, specifically, a material of the semi-reflective and semi-transmissive film layer 5 is selected from one or more of the group consisting of: gold, silver, copper, aluminum, iron, platinum, palladium, and rhodium.

Referring to FIG. 7a and FIG. 7b, specifically, the semi-reflective and semi-transmissive film layer 5 has a thickness of 5 nanometers~50 nanometers.

Figure 8A:
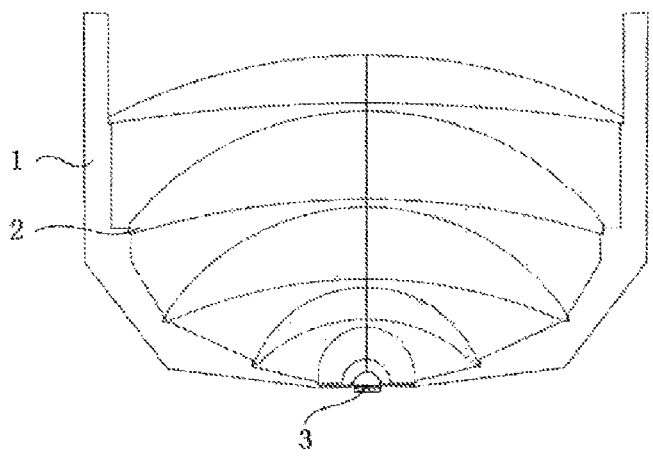
FIG. 8a is a structural schematic diagram of a refraction-type objective lens, with a waveguide layer, provided in some further embodiments of the present disclosure.
Figure 8B:
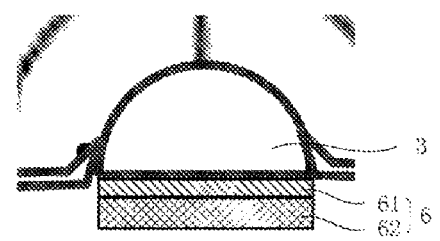

Referring to FIG. 8a and FIG. 8b, in some other embodiments, the objective lens 100 can realize a waveguide mode. The total reflection lens 3 is a hemispherical prism, a convex surface of the hemispherical prism is away from the side where the focal point is located, the plane of the hemispherical prism faces the side where the focal point is located, and a waveguide material layer 6 is deposited on the plane of the total reflection lens 3.

Referring to FIG. 8a and FIG. 8b, the waveguide material layer 6 includes a second metal layer 61 and a waveguide medium layer 62. The second metal layer 61 is deposited on the plane of the hemispherical prism; and the waveguide medium layer 62 is deposited on a side of the second metal layer 61 away from the hemispherical prism.

In the waveguide mode, a material of the second metal layer 61 is metal such as gold, silver, copper, aluminum, iron, platinum, palladium, and rhodium, with a thickness of 5 nanometers~50 nanometers. A material of the waveguide medium layer 62 is a medium material transparent under visible and infrared wavelengths, such as silicon dioxide and a doping material thereof, aluminum oxide and a doping material thereof, zinc selenide and a doping material thereof, and cadmium sulfide and a doping material thereof. The waveguide medium layer 62 has a thickness of 50 nanometers~30 nanometers.

Referring to FIG. 9, other implementation of the optical focusing assembly 2 are described below.

In some embodiments, the optical focusing assembly 2 includes a metal plate, the metal plate includes a cambered surface, and the metal plate is integrated with the housing 1.

The metal plate is a plate with sufficiently low surface roughness, specifically a metal mirror surface. Light is directly reflected by the metal plate and then focused at the focal point.

Referring to FIG. 9, in some embodiments, a curvilinear function of the cambered surface satisfies a parabolic equation. The focal point of the objective lens 100 is located at a focal point of the parabolic surface of the metal plate.

The parabolic equation is:

$$x^2 = 2 = p \times y \qquad \text{Formula (5)}$$

In the above, x-axis is an optical axis direction of the objective lens 100, y-axis is perpendicular to x-axis, and p represents a distance from the focal point to a directrix, 2 mm≤p≤100 mm. A position of the focal point of the parabolic surface is (0, p/2), and a position of a focal plane 160 is y=2/p. The parabolic surface is a part of y>p/2, wherein a light beam incident along an axial direction is reflected by the parabolic surface and then focused at the focal point, wherein an incident angle ranges from 30° to 90°.

In FIG. 9, the excitation angle θ is associated with radius r of annular light beam, and is adjusted by a beam changer 400 described later. The coverage area Δθ of the excitation angle is associated with the wall thickness d of the annular light beam, and is adjusted by the beam expander 300. The polarization state of the annular light beam can be adjusted by a polarizer 500 into one of a linear polarization state, an angular polarization state, and a radial polarization state. For the specific adjustment manner of each component, reference is made to the following description of a part of optical system.

Relationships between p, r, d, θ, and Δθ satisfy the following formula (6) and formula (7):

$$\frac{r}{2p} + \frac{p}{2r} = \cot\theta \qquad \text{Formula (6)}$$

-continued
$$\Delta\theta = \cot^{-1}\left(\frac{2r+d}{4p} + \frac{p}{2r+d}\right) - \cot^{-1}\left(\frac{2r-d}{4p} + \frac{p}{2r-d}\right) \qquad \text{Formula (7)}$$

In the above formulas (6) and (7), r is a radius of the annular light beam, and d is a wall thickness of the annular light beam.

The formulas (6) and (7) satisfied by the relationships between p, r, d, θ, and Δθ are applicable to various embodiments in which the optical focusing assembly 2 realizes gathering according to the reflection principle and realizes focusing according to the refraction principle.

The total reflection lens 3 and various film layers provided on the total reflection lens 3 described above are also applicable to the reflection-type objective lens 100. The description is made by way of example below, wherein for the part not explained, reference is made to the description about the part of the refraction-type objective lens 100 in the above.

Figure 10:
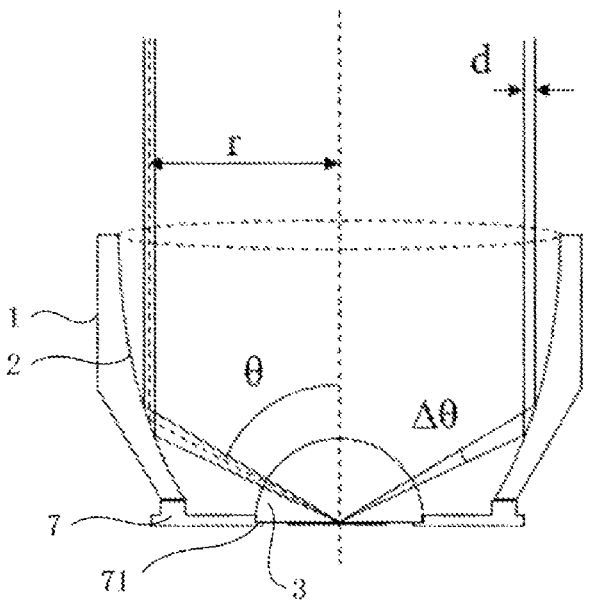
FIG. 10 is a structural schematic diagram of a reflection-type objective lens, with a total reflection lens, provided in some embodiments of the present disclosure.

Referring to FIG. 10, the reflection-type objective lens 100 further includes the total reflection lens 3, the total reflection lens 3 is at least partially located outside the housing 1, and the sphere center of the total reflection lens 3 is located at the focal point of the optical focusing assembly 2. The sphere center of the hemispherical prism coincides with the focal point of the parabolic surface.

The total reflection lens 3 may be a hemispheric prism, and the hemispheric prism is in an integral structure or a pieced structure. By providing the total reflection lens 3, light forms total reflection on a side of the plane of the total reflection lens 3, which is particularly suitable for scenes requiring optical detection in the total reflection mode.

Referring to FIG. 10, the total reflection lens 3 is fixedly connected to the housing 1 through a bracket 7. The bracket 7 is annular, an inner wall of the bracket 7 is provided with a boss 71 for supporting the total reflection lens 3, and the total reflection lens 3 is placed on the boss 71.

Figure 11A:
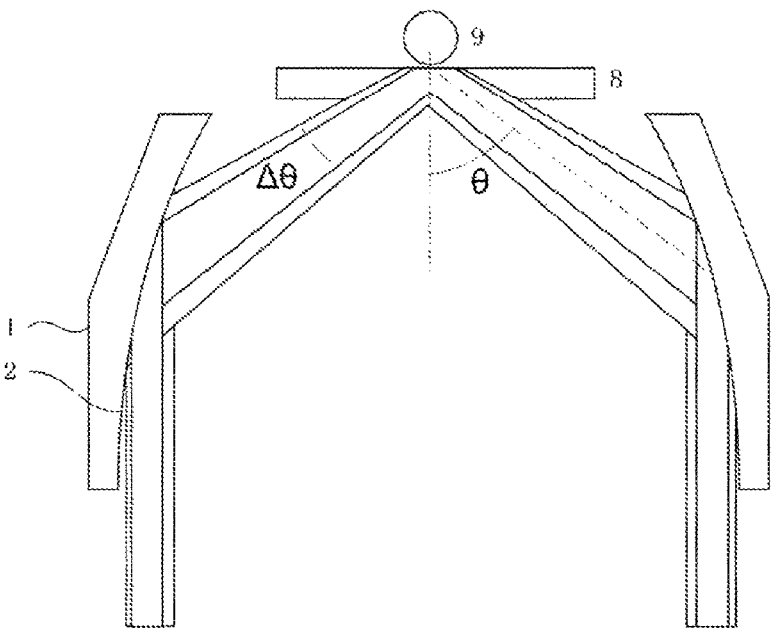
FIG. 11a is a structural schematic diagram of an optical imaging device with a substrate, nanoparticles, and a reflection-type objective lens, provided in some embodiments of the present disclosure.
Figure 11B:
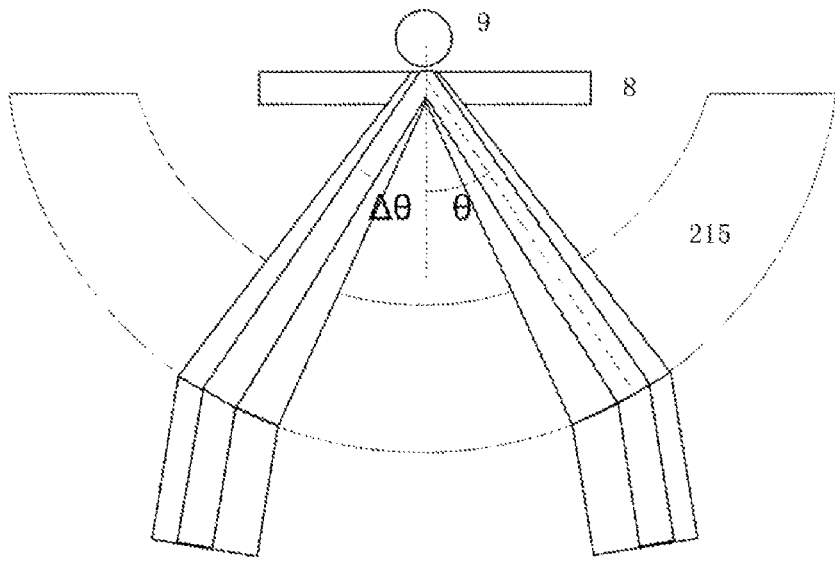
FIG. 11b is a structural schematic diagram of an optical imaging device with a substrate, nanoparticles, and a refraction-type objective lens, provided in some embodiments of the present disclosure.

Referring to FIG. 11a and FIG. 11b, some other embodiments of the present disclosure provide an optical imaging device 750, including the objective lens 100 provided in any one of the technical solutions of the present disclosure. The optical imaging device 750 can independently set the excitation angle and the polarization state for samples with different characteristics, and appropriate excitation angle and excitation polarization state can significantly improve the sensitivity of optical spectrum.

The optical imaging device 750 may be any optical imaging device that requires the objective lens 100, such as a spectral analyzer and a microscope.

Referring to FIG. 11a and FIG. 11b, in some embodiments, the optical imaging device 750 further includes a substrate 8, the substrate 8 is provided outside the housing 1, and the substrate 8 is configured to dispose a sample 900 to be detected.

The substrate 8 may be provided regardless of whether the objective lens 100 is provided with the total reflection lens 3 or not. As shown in FIG. 11a, if the total reflection lens 3 is not provided, the substrate 8 is directly disposed at the focal point of the objective lens 100, that is, the focal point of the light of the objective lens 100 is located on an upper surface of the substrate 8. The objective lens 100 may be the reflection-type objective lens 100 as shown in FIG. 11a, and a transmission-type objective lens 100 as shown in FIG. 11b, as described above. By providing the substrate 8, it is convenient to dispose, deposit, and prepare the sample 900 to be detected.

Referring to FIG. 11*a* and FIG. 11*b*, in some embodiments, the substrate 8 carries nanoparticles 9, and the nanoparticles 9 are located in a focal point region of the optical focusing assembly 2. The focal point region refers to a small region with the focal point as a center. By providing the nanoparticles, the excitation efficiency is effectively enhanced and the optical detection performance is improved.

A material of the nanoparticles 9 located in the focal point region is precious metal such as gold, silver, and copper, and the nanoparticles 9 have a dimension of 20 nanometers~500 nanometers.

Figure 12A:
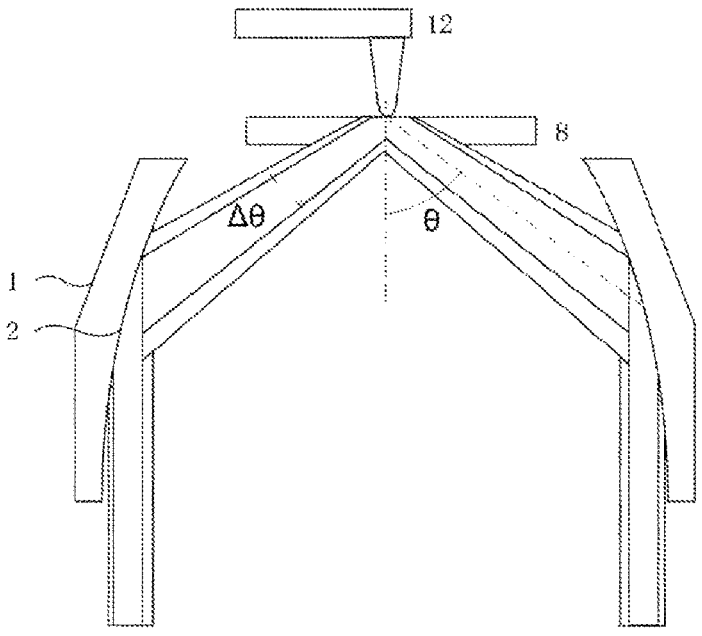
FIG. 12a is a structural schematic diagram of an optical imaging device with a substrate, a probe, and a reflection-type objective lens, provided in some embodiments of the present disclosure.
Figure 12B:
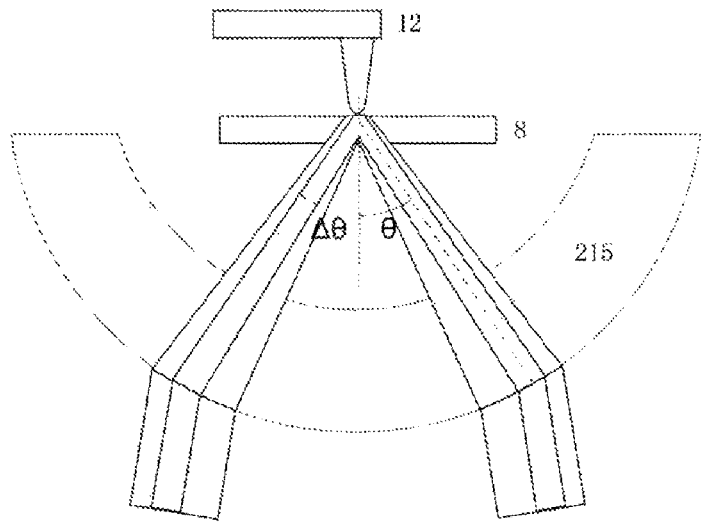
FIG. 12b is a structural schematic diagram of an optical imaging device with a substrate, a probe, and a refraction-type objective lens, provided in some embodiments of the present disclosure.

Referring to FIG. 12*a* and FIG. 12*b*, in some other embodiments, the objective lens 100 of the optical imaging device 750 is not provided with the total reflection lens 3, and there is no nanoparticle 9 provided on the substrate 8 thereof. In this case, the detection can be realized by an excitation enhanced spectral probe 12.

FIG. 12*a* shows a parabolic reflection-type objective lens 100. A schematic diagram of relative positions of a focal plane of the objective lens 100, the substrate 8, and the enhanced spectral probe 12 is shown. An upper surface of the substrate 8 coincides with the focal plane, the sample 900 is molecules, the molecules to be detected are located on this plane, and the excitation enhanced spectral probe 12 is disposed at the focal point. A a material of a tip of the excitation enhanced spectral probe 12 used in the probe-enhanced spectroscopy is metal such as gold, silver, copper, aluminum, iron, platinum, palladium, and rhodium, and the tip has a radius of 5 nanometers~1500 nanometers. The excitation light, after passing through the substrate 8, excites the above excitation enhanced spectral probe 12 at an angle $\theta$, sample scattered light signals originating from the focal region are collected by the objective lens 100, and subsequently collected and detected by a detection analyzer. The detection analyzer is, for example, a spectrometer 701. The magnitude of the angle of the excitation angle $\theta$ is controlled and adjusted by the beam expander 300 described later.

FIG. 12*b* shows a refraction-type objective lens 100. A schematic diagram of relative positions of the focal plane of the objective lens 100, the substrate 8, and the excitation enhanced spectral probe 12 is shown. An upper surface of the substrate 8 coincides with the focal plane, the molecules to be detected are located on this plane, and the excitation enhanced spectral probe 12 is disposed at the focal point. The excitation light, after passing the fifth lens 215, passes through the substrate 8 to excite the above excitation enhanced spectral probe 12 at the excitation angle $\theta$. The specific magnitude of angle of the excitation angle $\theta$ is controlled and adjusted by the beam expander 300 described later.

Figure 13A:
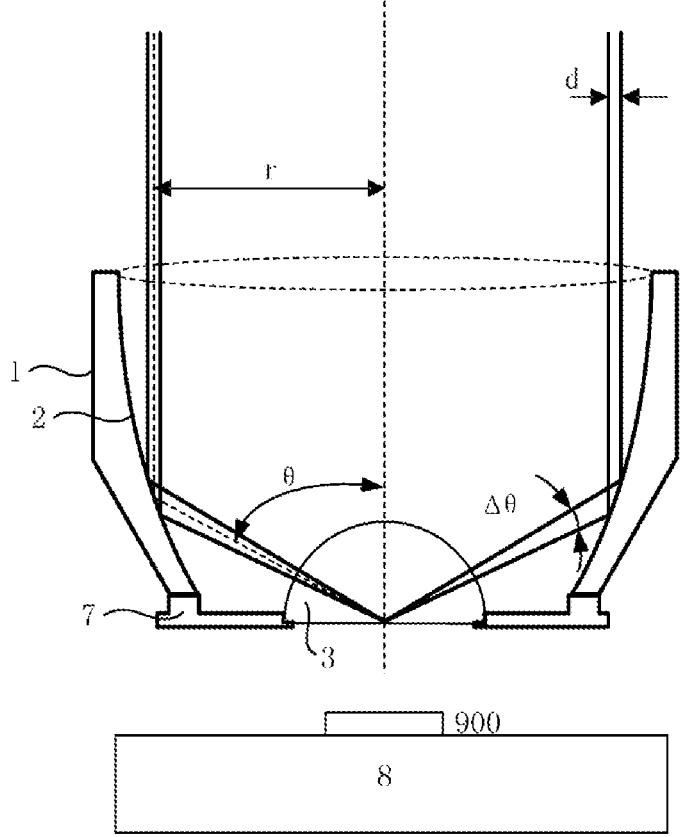
FIG. 13a is a structural schematic diagram of a reflection-type objective lens of an optical imaging device, with a substrate and a total reflection lens being arranged at intervals, provided in some embodiments of the present disclosure
Figure 13B:
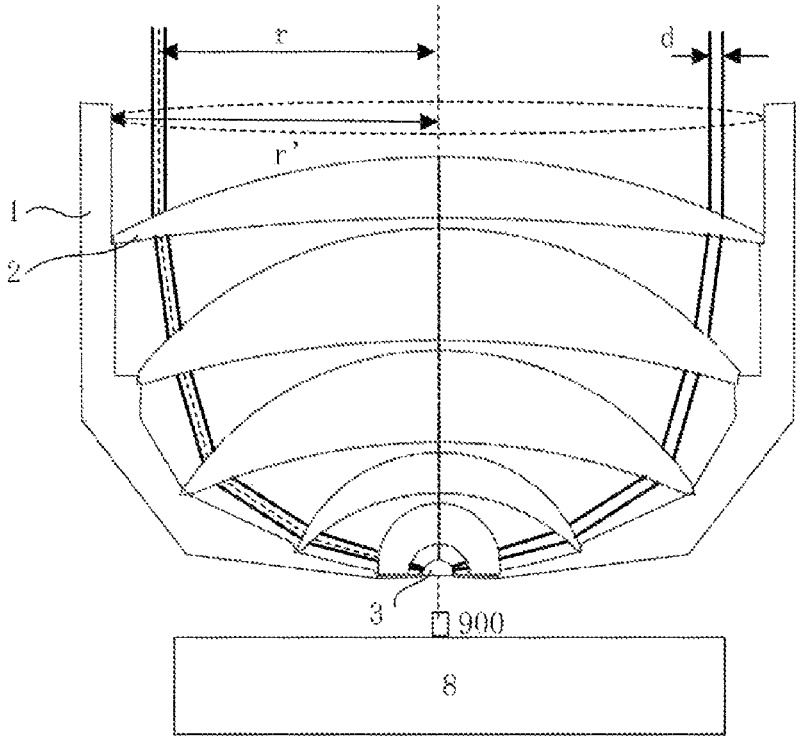
FIG. 13b is a structural schematic diagram of a refraction-type objective lens of an optical imaging device, with a substrate and a total reflection lens being arranged at intervals, provided in some embodiments of the present disclosure.

Referring to FIG. 13*a* and FIG. 13*b*, the objective lens 100 in FIG. 13*a* is a reflection-type objective lens 100, and the objective lens 100 in FIG. 13*b* is a transmission-type objective lens 100. An embodiment in which the substrate 8 is spaced apart from the total reflection lens 3 is described below.

Specifically, the objective lens 100 of the optical imaging device 750 is provided with the total reflection lens 3, the substrate 8 is spaced apart from the total reflection lens 3, and the substrate 8 is located outside the focal point of the objective lens 100. The sample 900 to be detected is disposed on the surface of the substrate 8 facing the total reflection lens 3.

Figure 14B:
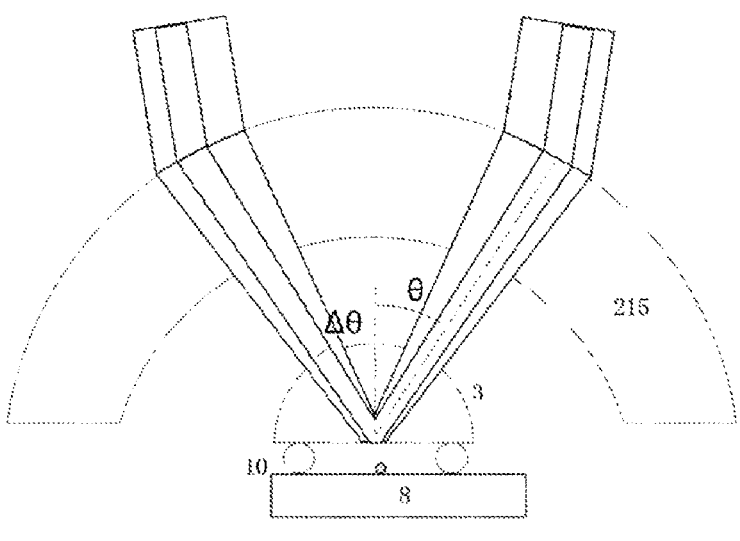
FIG. 14b is a structural schematic diagram of a refraction-type objective lens of an optical imaging device, with micro-nanospheres being sandwiched between a substrate and a total reflection lens, provided in some embodiments of the present disclosure.

Referring to FIG. 14*a* and FIG. 14*b*, the objective lens 100 in FIG. 14*a* is a reflection-type objective lens 100, and the objective lens 100 in FIG. 14*b* is a transmission-type objective lens 100. An embodiment in which the substrate 8 is spaced apart from the total reflection lens 3 and micro-nanospheres 10 are sandwiched therebetween is described below.

In some other embodiments, the objective lens 100 of the optical imaging device 750 is provided with the total reflection lens 3, the substrate 8 is spaced apart from the total reflection lens 3, and the substrate 8 is located outside the focal point of the objective lens 100. The micro-nanospheres 10 are sandwiched between the substrate 8 and the total reflection mirror 3. The sample is disposed on the surface of the substrate 8 facing the total reflection lens 3. The micro-nanospheres 10 are configured to control the spacing between the substrate 8 and the total reflection lens 3.

Figure 15A:
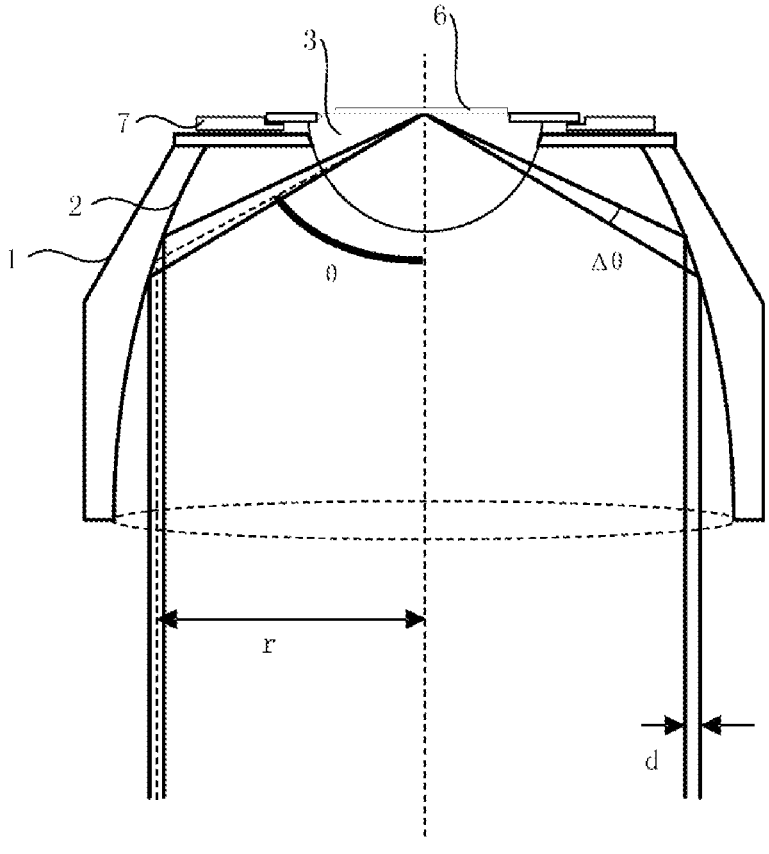
FIG. 15a is a structural schematic diagram of an inverted optical imaging device, with a reflection-type objective lens, provided in some embodiments of the present disclosure.
Figure 15B:
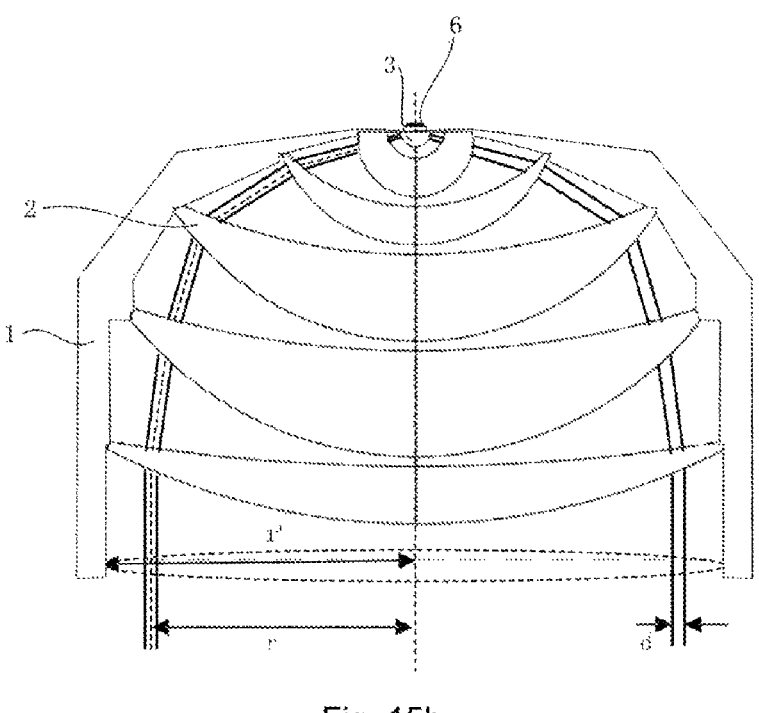
FIG. 15b is a structural schematic diagram of an inverted optical imaging device, with a refraction-type objective lens, provided in some embodiments of the present disclosure.

Referring to FIG. 15*a* and FIG. 15*b*, the objective lens 100 in FIG. 15*a* is a reflection-type objective lens 100, and the objective lens 100 in FIG. 15*b* is a transmission-type objective lens 100. An implementation of an inverted objective lens is described below.

A structure of the reflection-type objective lens in FIG. 15*a* is the same as that of the reflection-type objective lens in FIG. 10 described above, and a structure of the refraction-type objective lens in FIG. 15*b* is the same as that of the refraction-type objective lens in FIG. 3 described above. The difference lies in that the objective lenses 100 have different orientations. In FIG. 3 and FIG. 10, the total reflection lens 3 is located below the housing 1, while In FIG. 15*a* and FIG. 15*b*, the total reflection lens 3 is located above the housing 1.

In FIG. 15*a* and FIG. 15*b*, the total reflection lens 3 is located above the housing 1. To clearly illustrate the waveguide material layer 6 provided on the surface of the total reflection lens 3, a sketch the bracket 7 is sketched.

Refer to the above description about FIG. 3 and FIG. 10 for other parts, which are not described herein again.

Figure 16A:
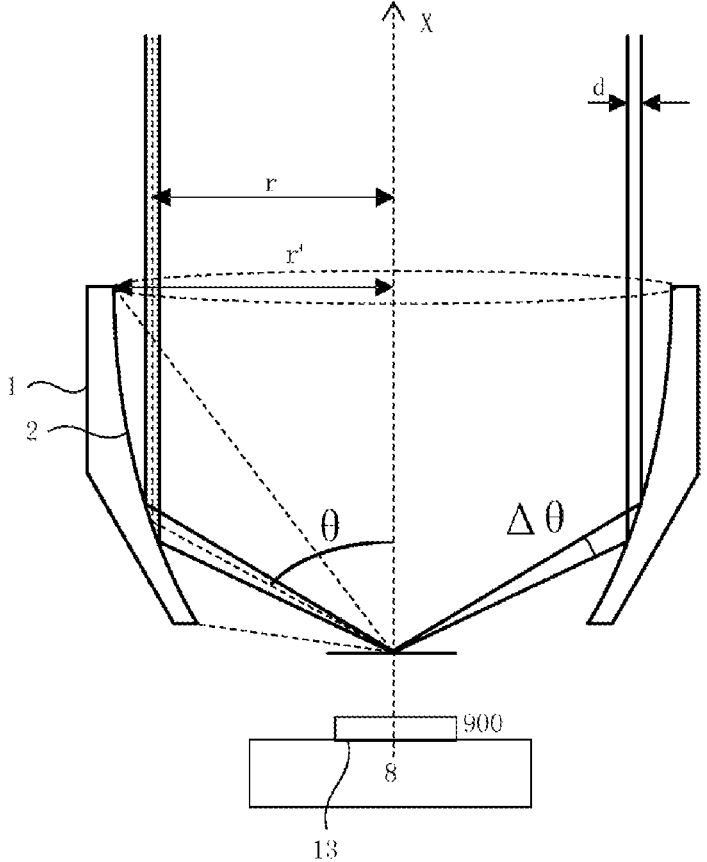
FIG. 16a is a structural schematic diagram of an optical imaging device, with an enhancement layer being provided on a surface of a substrate, and having a reflection-type objective lens, provided in some embodiments of the present disclosure.
Figure 16B:
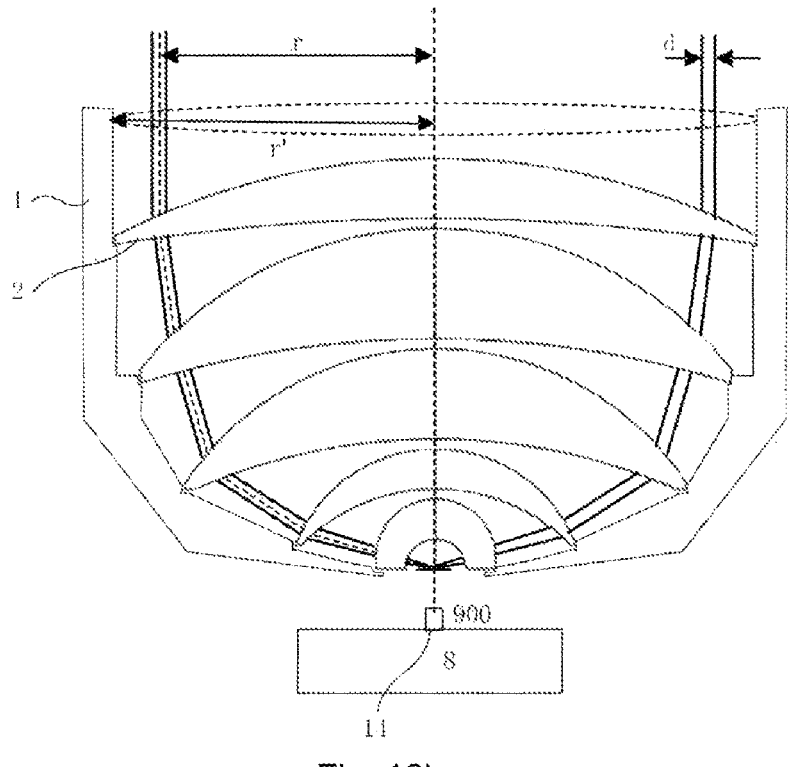
FIG. 16b is a structural schematic diagram of an optical imaging device, with an enhancement layer being provided on a surface of a substrate, and having a refraction-type objective lens, provided in some embodiments of the present disclosure.

Referring to FIG. 16*a* and FIG. 16*b*, in some other embodiments, the substrate 8 is located outside the focal point of the optical focusing assembly 2. The sample 900 to be detected is located at one side of the substrate 8 facing the total reflection lens 3.

The substrate 8 is made of a metal material or a non-metal material. If the substrate 8 is made of a metal material, a metal layer and a two-dimensional material film layer may not be provided on the surface of the substrate 8. If the substrate 8 is made of a non-metal material, optionally, a third metal layer 13 or a two-dimensional material film layer 14 is provided at a side of the substrate 8 facing the housing 1.

The material of the third metal layer 13 is selected from one or more of the group consisting of: gold, silver, copper, platinum, and palladium.

The material of the two-dimensional material film layer 14 is selected from one or more of the group consisting of: graphene, boron nitride, a transition metal chalcogenide, and a heterojunction composed of a transition metal chalcogenide.

The optical imaging device 750 provided in the above technical solution can be used in an optical sectioning microscope described later.

Figure 17:
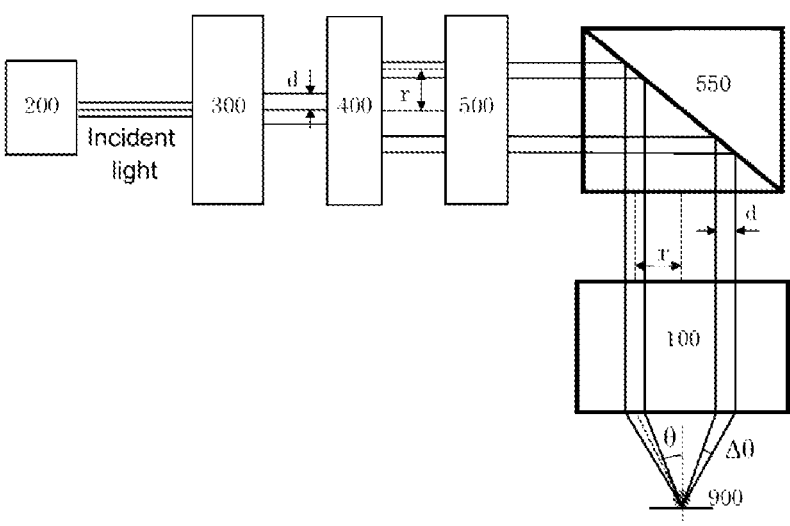
FIG. 17 is a structural schematic diagram of an optical imaging device provided in some further embodiments of the present disclosure.

Referring to FIG. 17, in some embodiments, the optical imaging device 750 further includes a laser device 200 and a beam expander 300. The laser device 200 is configured to emit laser. The beam expander 300 is provided upstream of the optical focusing assembly 2 and downstream of the laser device 200, so as to expand light emitted by the laser device 200.

The laser device 200 emits excitation light beam so as to excite samples. The laser emitted by the laser device 200 is single-wavelength light with a wavelength of, for example, 325 nm-1064 nm. The light beam is single-mode TEM 00, and the light beam energy distribution satisfies Gaussian equation. The light beam is linearly polarized, with a polarization ratio being not less than 30:1. A diameter of the light beam ranges from 1 mm-3 mm.

Figure 18:
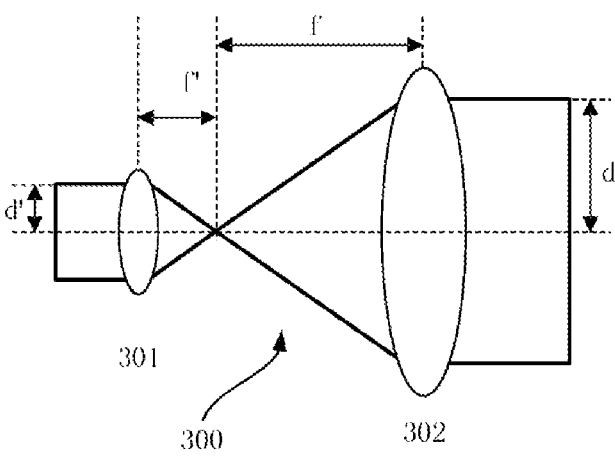
FIG. 18 is a schematic diagram of principle of a beam expander of an optical imaging device provided in some further embodiments of the present disclosure.

Referring to FIG. 18, the beam expander 300 is configured to enlarge the radius of the laser light beam, a beam expanding rate of the beam expander 300 depends on performance of the objective lens 100, and a beam diameter magnification of the beam expander 300 is 1.5-10 times. The beam expander 300 includes a front lens 301 and a rear lens 302.

The beam expanding rate of the beam expander 300 satisfies the following formula (8):

$$\frac{d}{d'} = \frac{f}{f'} \qquad \text{Formula (8)}$$

In the above, d is a light beam diameter after beam expanding, d' is an initial light beam diameter, f is a focal length of a front lens 301, and f is a focal length of a rear lens 302.

The laser emitted by the laser device 200, after passing through the beam expander 300, becomes solid laser. The radius of the solid laser is expanded to the radius d by the beam expander 300. The excitation light beam with the expanded radius is converted by the beam changer 400 into an annular light beam with the radius r. The annular light beam means that a light spot obtained on a baffle or a detector which is arranged in front of the light beam is annular. The annular light beam is converted into an annular vector polarized light beam through the polarizer 500. The annular vector polarized light beam is incident into the objective lens 100 through a third reflecting mirror 550. After passing through the objective lens 100, vector light beam is focused in the sample region at the focal plane (160) in a conical shape according to an angle θ. The beam changer 400 adjusts r, and further adjusts an incident tapered angle θ. The beam expander 300 adjusts d, and further adjusts a coverage area Δθ of the incident tapered angle, i.e., a coverage angle adjustment area Δθ. According to different sample characteristics, the polarizer 500 is adjusted so as to select a suitable polarization state of excitation light, and the beam expander 300 and the beam changer 400 are adjusted so as to adjust the excitation angle θ and the excitation angle coverage area Δθ. The excitation angle θ can be adjusted within the range of 0~85°, and the adjustment range is quite wide, therefore the applicable scenarios are greatly expanded, the coverage angle adjustment area Δθ is 0.5°~5°, and the minimum adjustment amount can reach 1° or less, with quite high adjustment precision. The above technical solution has important application values in the field of optical spectra related to the excitation angle and the polarization state, such as the fields of plasmon-enhanced spectra and nano infrared spectra.

Figure 19:
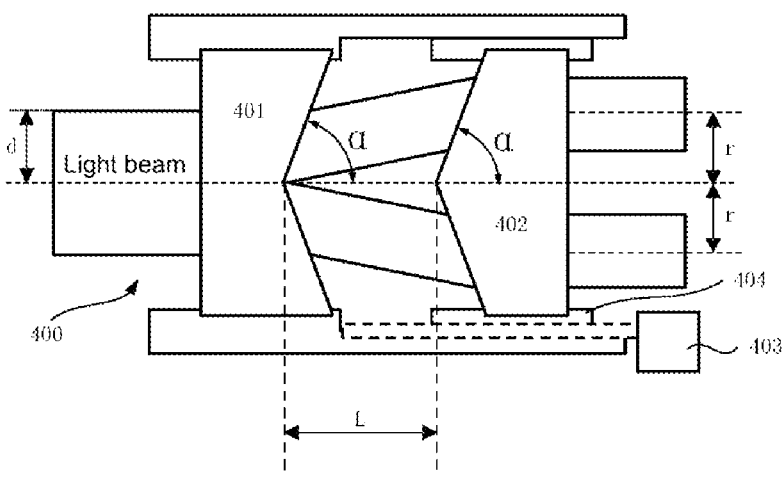
FIG. 19 is a schematic diagram of principle of a beam changer of an optical imaging device provided in some further embodiments of the present disclosure.

Referring to FIG. 17 and FIG. 19, in some embodiments, the optical system further includes the beam changer 400, wherein the beam changer 400 includes a first axicon 401 and a second axicon 402, and a distance between the first axicon 401 and the second axicon 402 is adjustable. For example, at least one of the first axicon 401 and the second axicon 402 is configured to be movable so as to facilitate adjustment of the distance therebetween. In the case shown in FIG. 19, the second axicon 402 is configured to be axially movable along itself, i.e., movable in a light path direction, and by driving the second axicon 402 to move by a stepper motor 403, the distance between the first axicon 401 and the second axicon 402 is adjusted. The first axicon 401 is located between the beam changer 400 and the second axicon 402, the first axicon 401 includes an inwardly concave conical surface, the second axicon 402 includes an outwardly convex conical surface, and the inwardly concave conical surface and the outwardly convex conical surface are arranged opposite to each other. In the above, the beam changer 400 is configured to change the radius of light coming out through the beam expander 300.

The first axicon 401 and the second axicon 402 have the same refractive index, both being n. The tapered angles of the first axicon 401 and the second axicon 402 are equal, both being α. The solid light beam with the radius d, after passing through the beam changer 400, is converted into an annular light beam with the radius r. An edge thickness of the annular light beam is d". r and d" satisfy the following formula (9) and formula (10):

$$r = \frac{d}{2} + L * n * \cos(\alpha) \qquad \text{Formula (9)}$$

$$d'' = d \qquad \text{Formula (10)}$$

In the above, L is a minimum axial distance between the first axicon 401 and the second axicon 402 along an optical axis direction of each axicon; by driving the second axicon 402 to move along an electric slide rail 404 by the stepper motor 403, a position of the second axicon 402 can be adjusted, the magnitude of the distance L between the first axicon 401 and the second axicon 402 is further adjusted, and finally, the radius r of the annular light beam is adjusted.

Figure 20A:
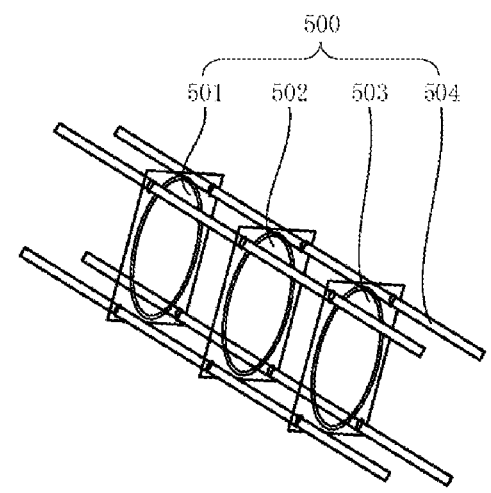
FIG. 20a is a schematic diagram of principle of a polarizer of an optical imaging device provided in some further embodiments of the present disclosure.
Figure 20B:
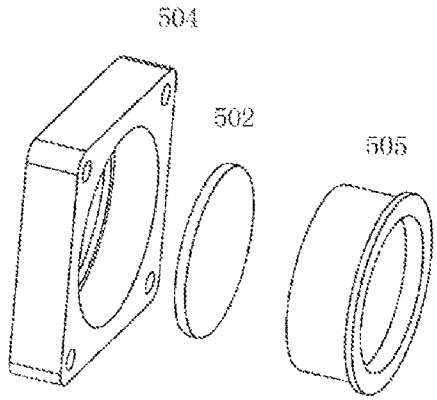
FIG. 20b is a structural schematic diagram of various wave plates of a polarizer of an optical imaging device provided in some further embodiments of the present disclosure.

Referring to FIG. 17, FIG. 20a, and FIG. 20b, in some embodiments, the optical imaging device 750 further includes the polarizer 500, wherein the polarizer 500 includes a linear polaroid 501, a half-wave plate 502, and a spiral wave plate 503. The half-wave plate 502 is located between the linear polaroid 501 and the spiral wave plate 503; the polarizer 500 is located between the beam changer 400 and the housing 1, and the polarizer 500 is configured such that light passing through the beam changer 400 becomes one of the following: linearly polarized light, radially polarized light, and angularly polarized light.

The wave plate has two main axes: a fast axis and a slow axis. Refractive indexes on the two axes are different, and therefore velocities of light thereof are also different. When the linearly polarized light is incident on the half-wave plate 502, and the polarization direction does not coincide with the fast axis or the slow axis, emergent light is still linearly polarized light, but rotates with respect to a polarization direction of the incident light. When circularly polarized light is incident on the half-wave plate 502, clockwise (counterclockwise) circularly polarized light will be converted into counterclockwise (clockwise) circularly polarized light.

The half-wave (λ/2) plate is configured to rotate a linear polarization direction of the incident light beam. When the half-wave plate 502 is mounted on a rotary mounting base, it can be used as a polarization optical rotator capable of continuous adjustment. In addition, when used in cooperation with a polarization beam splitter, the half-wave plate can be used as a beam splitter with a variable proportion. An included angle between a polarization direction of emergent light and a polarization direction of incident light is twice an included angle between a polarization direction of the incident light and a main axis of the wave plate. When the polarization direction of the incident light coincides with the fast axis or the slow axis, the polarization direction remains unchanged.

The distance between the linear polaroid 501, the half-wave plate 502, and the spiral wave plate 503 is set as required. By adjusting a rotation angle between the linear polaroid 501, the half-wave plate 502, and the spiral wave plate 503, the polarization state of the annular excitation light is adjusted.

The polarizer 500 converts the linearly polarized annular light beam into a radially or angularly polarized light beam, as the structure of the polarizer 500 shown in FIG. 20*a* and FIG. 20*b*. An annular linearly polarized light beam emitted from the laser device 200 passes through the linear polaroid 501, the half-wave plate 502 and the spiral wave plate 503 in sequence. A transmission polarization direction of the linear polaroid 501 and an excitation light polarization direction are kept consistent. The polarization direction of the excitation light can be adjusted by rotating the direction of the half-wave plate 502. A suitable polarization direction is selected, and after passing through the spiral wave plate 503, the annular light beam becomes an annular radially or angularly polarized light beam.

To obtain linearly polarized light, the polarizer 500 satisfies the following relationships: the fast axis of the one-half wave plate is perpendicular to the fast axis of the spiral wave plate 503, and when an included angle between the fast axis of the half-wave plate 502 and the polarization direction of the linear polaroid 501 is $\beta$, an included angle between polarization direction of emergent light and the linear polarization direction is $2\beta$.

To obtain the radially polarized light, the polarizer 500 satisfies the following relationship: after passing through the one-half wave plate (i.e., the half-wave plate 502), the polarization direction of the linearly polarized light beam coincides with the fast axis of the spiral wave plate 503.

To obtain the angularly polarized light, the polarizer 500 satisfies the following relationship: after passing through the one-half wave plate (i.e., the half-wave plate 502), when the polarization direction of the linearly polarized light beam is perpendicular to the fast axis of the spiral wave plate 503, the emergent light is angularly polarized light.

With continued reference to FIG. 17, FIG. 20*a*, and FIG. 20*b*, the polarizer 500 further includes a support member 504, wherein the linear polaroid 501, the half-wave plate 502, and the spiral wave plate 503 are all supported by the support member 504, and the half-wave plate 502 is rotatably mounted on the support member 504. Specifically, each wave plate may be rotatably mounted on a rotating cylinder 505 through the rotating cylinder 505, and the rotating cylinder 505 is rotatably mounted with the support member 504 in a manner such as hinging.

In some embodiments, the polarization direction of light output from the half-wave plate 502 coincides with the fast axis of the spiral wave plate 503, and the polarizer 500 outputs the radially polarized light.

In some embodiments, the polarization direction of light output from the half-wave plate 502 coincides with the fast axis of the spiral wave plate 503, and the polarizer 500 outputs the angularly polarized light.

Figure 21A:
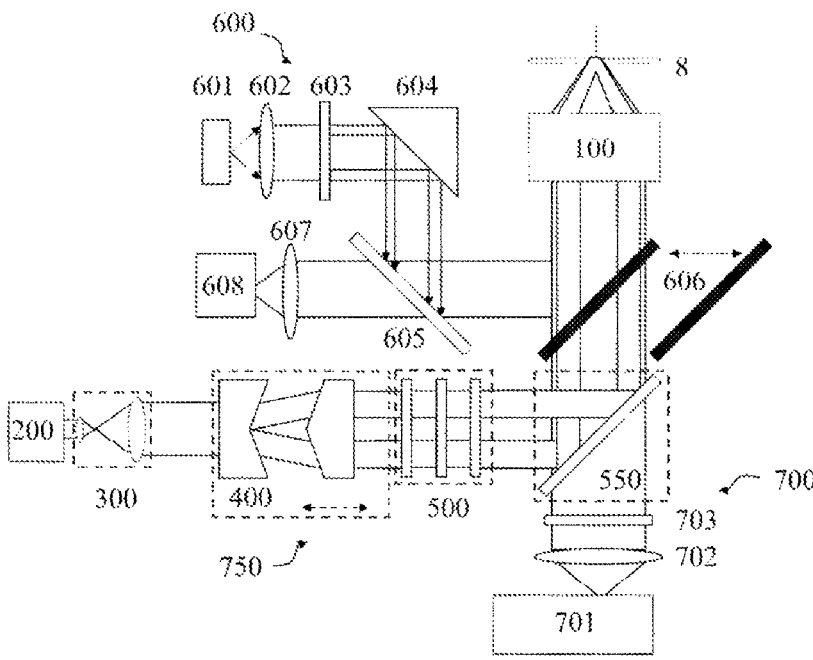
FIG. 21a is a schematic diagram of principle of an optical system provided in some embodiments of the present disclosure.

Referring to FIG. 21*a* to FIG. 22, some other embodiments of the present disclosure provide an optical system, including the optical imaging device 750 provided in any one of the technical solutions of the present disclosure. The sample 900 detected by this optical system may be in a gaseous environment or a liquid environment. The samples 900 in the detection method introduced in other embodiments may be in a gaseous environment or a liquid environment.

Referring to FIG. 21*a* and FIG. 21*b*, the optical system introduced in the present embodiment is particularly suitable for annular vector polarized excitation nanoparticle and annular excitation enhanced probe. The nanoparticle and the annular excitation enhanced probe are used alternatively. If the optical imaging device 750 uses the annular excitation enhanced probe, the annular vector polarization excitation annular excitation enhanced probe is used. If the substrate 8 of the optical imaging device 750 is provided with the nanoparticles 9 on its surface, the annular vector polarized excitation particle is used. For a detailed description of the objective lens 100 of the optical imaging device 750, please refer to the above description about FIG. 11*a* to FIG. 12*b*.

Referring to FIG. 21*a*, the optical system includes an illumination device 600, the optical imaging device 750, and a spectrum detection device 700.

Referring to FIG. 21*a*, in some embodiments, the illumination device 600 includes a visible light source 601, a lens 602, and an annular baffle 603. If it is desired to change the direction of propagation of the light, the illumination device 600 also includes a first reflecting mirror 604, a semi-reflective and semi-transmissive lens 605, and a second reflecting mirror 606 that is moveable. The second reflecting mirror 606 is moved along a direction perpendicular to its own plane, so as to move light into and out of the light path as required.

Referring to FIG. 21*a*, specifically, the lens 602 is arranged between the visible light source 601 and the objective lens 100. The annular baffle 603 is arranged between the lens 602 and the objective lens 100. The first reflecting mirror 604 is arranged between the annular baffle 603 and the objective lens 100. The semi-reflective and semi-transmissive lens 605 is arranged in parallel with the reflecting surface of the first reflecting mirror 604. The second reflecting mirror 606 is moveably arranged between the third reflecting mirror 550 of the optical imaging device 750 and the objective lens 100, and the second reflecting mirror 606 is configured to switch between two following positions: being located on a light path between the third reflecting mirror 550 and the objective lens 100 to reflect light from the visible light source 601 into the objective lens 100; and being located outside the light path between the third reflecting mirror 550 and the objective lens 100, so as not to hinder the propagation of light between the third reflecting mirror 550 and the objective lens 100. A first focusing mirror 607 is located on a side of the semi-reflective and semi-transmissive lens 605 away from the second reflecting mirror 606. The imaging sensor 608 is located on a side of the first focusing mirror 607 away from the semi-reflective and semi-transmissive lens 605.

When it is necessary to reflect the light from the semi-reflective and semi-transmissive lens 605 into the objective lens 100, the second reflecting mirror 606 is located in the light path between the third reflecting mirror 550 and the objective lens 100. It can be understood that the light path is reversible, and when it is necessary to reversely propagate the light path in the direction described above, it is also required to move the second reflecting mirror 606 into the light path. When it is necessary to propagate light from the objective lens 100 into the spectrum detection device 700, the second reflecting mirror 606 is moved out of the light path between the third reflecting mirror 550 and the objective lens 100. The movement of the second reflecting mirror 606 is a linear reciprocating movement, which can be achieved by providing a linear reciprocating driving device, such as a linear motor. In order to improve the automation degree of the device and the precision of the movement control, a control device such as a displacement sensor or PLC may also be provided, so as to achieve precise control for the displacement of the second reflecting mirror 606.

A specific light path of the illumination device 600 during operation is described below: firstly, the second reflecting mirror 606 is moved into the light path, and subsequently, the illumination device 600 is adjusted to operate. Bandwidth visible light emitted from the visible light source 601 becomes parallel light after passing through the lens 602, then it is converted into annular light after passing through the annular baffle 603, and is changed in direction by the first reflecting mirror 604, after that, it is emitted to the semi-reflective and semi-transmissive lens 605, and then a part of light is irradiated to the movable second reflecting mirror 606, and enters the objective lens 100 of the optical imaging device 750. In the embodiment shown in FIG. 21*a*, the optical imaging device 750 includes the substrate 8, and the focal point of the objective lens 100 is located on the surface of the substrate 8. Therefore, the visible light emitted from the illumination device 600 enters the objective lens 100, and then forms a bright spot on the surface of the substrate 8. By observing the bright spot, a focusing debugging before detection is realized.

With continued reference to FIG. 21*a*, the optical imaging device 750 includes the laser device 200, the beam expander 300, the beam changer 400, the polarizer 500, and the objective lens 100 described above. In order to facilitate setting of positional relationships of respective components and adjustment of the light path direction, the optical imaging device 750 further includes a third reflecting mirror 550. The light emitted by the laser device 200 of the optical imaging device 750 sequentially passes through the beam expander 300, the beam changer 400, the polarizer 500, the third reflecting mirror 550, and the objective lens 100, and then is focused on the upper surface of the substrate 8, so as to excite the sample herein. By adjusting the beam expander 300, the beam changer 400, and the polarizer 500, it is realized that the excitation light excites the sample 900 according to the required excitation angle θ, angle coverage area Δθ, and polarization state excitation.

The spectrum detection device 700 collects scattered light of the sample formed on the surface of the substrate 8, for subsequent optical detection and analysis. In this case, the second reflecting mirror 606 is located outside the light path. A collection sequence of light path of the spectrum detection device 700 is: the scattered light on the surface of the substrate 8, after passing through the objective lens 100, is transmitted to the third reflecting mirror 550, and a dichroscope 550*a* of the third reflecting mirror 550 transmits the light to an filter lens 703, and then the light is focused by the second focusing mirror 702, and finally enters the spectrometer 701. In the above, referring to FIG. 22, the third reflecting mirror 550 includes the dichroscope 550*a*, wherein the dichroscope 550*a* can reflect excitation light to the objective lens 100 at 45°, and the reflectivity exceeds 98%; meanwhile, the scattered light signals emitted from the direction of the sample 900 and the objective lens 100 can be completely transmitted, and the transmission efficiency is more than 75%.

It should be noted first that, in the present embodiment and various embodiments below, basic steps of the optical detection method all include following several steps: adjusting the objective lens of the optical imaging device by the illumination device 600 so as to realize focusing; adjusting the polarization state, the excitation angle, and the coverage angle adjustment area of the laser light path of the imaging device 750 so as to make characteristics of the excitation light satisfy excitation requirements of the sample; and collecting an image of the sample under the laser excitation and analyzing the same. According to different specific detection requirements, manners of adjusting the excitation light are also different, and specific situations of various embodiments will be described in detail below. For parts which are not mentioned, refer to the detection process described in this paragraph, if without conflict.

With reference to FIG. 21*b*, how to use the optical system provided in the present embodiment to implement a first optical detection method, which is an optical detection method in an annular vector polarized excitation particle or nanoprobe mode, is described below. In this detection method, the objective lens 100 can be a parabolic reflecting objective lens or a refraction-type objective lens 100. The objective lens 100 is applicable to a spectrometer placed in both a forward direction and an inverted direction.

Step S1100: making a white light illumination device 600 operate until a clear image of nanoparticle or probe is observed on the imaging sensor 608.

In this step, the second reflecting mirror 606 is located in the light path. The light path of the illumination device 600 is as follows: bandwidth visible light emitted from the visible light source 601 of the illumination device 600 becomes parallel light after passing through the lens 602, then becomes annular light after passing through the annular baffle 603, after that, it passes through the first reflecting mirror 604, the semi-reflective and semi-transmissive lens 605, and the movable second reflecting mirror 606, and then enters the objective lens 100 of the optical imaging device 750. If it is the excitation nanoparticle 9, the light is focused near the nanoparticles 9. If it is the excitation probe, the light is focused near the tip of the probe. An inverted spectrometer structure is commonly used in the method of probe enhanced spectroscopy, and the excitation light polarization uses a radial polarization state. The light path of the illumination device 600 is likewise applicable to various embodiments below.

Taking the nanoparticles 9 as an example: light scattered by the nanoparticles 9 is collected by the objective lens 100, and subsequently passes through the second reflecting mirror 606 that is movable and the semi-reflective and semi-transmissive lens 605, then passes through the first focusing mirror 607, and finally, imaging is performed by the imaging lens on the surface of the imaging sensor 608. Whether or not the sample is located at the focal point of the objective lens 100 is judged by observing the imaging.

Step S1200: making the optical imaging device 750 and the spectrum detection device 700 operate, and in this case, the illumination device 600 no longer functioning. The laser emitted by the optical imaging device 750 will irradiate the region of the nanoparticles 9 or the region of the excitation enhanced spectral probe 12 at a high angle in a ring shape.

Step S1300: adjusting the angle coverage area of the excitation light. A beam expansion ratio is calculated according to a required radius of the laser light beam, and the beam expander 300 meeting the requirement of the beam expansion ratio is selected. For example, the radius of the laser light beam is 0.25 mm, and the beam expansion ratio of the beam expander 300 is 1.6, so that the output light beam has a radius of 0.4 mm.

Step S1400: adjusting an excitation angle of the excitation light. Specifically, by adjusting the position of the electric slide rail of the beam changer 400, the distance between the first axicon 401 and the second axicon 402 is changed, the radius of the annular light beam is adjusted, and further the excitation angle is adjusted.

Step S1500: determining a light polarization state of the excitation light, and adjusting the polarizer 500 to make the excitation light satisfy a required polarization state.

Specifically, according to properties and target characteristics of the sample 900 to be detected, the following configurations are making respectively:

situation 1: if the sample 900 to be detected responds optimally to a polarization perpendicular to the surface of the substrate 8, radial polarization is used. In this case, the polarizer 500 is adjusted so that the light beam polarization passing through a one-half wave plate (i.e., the half-wave plate 502) coincides with the fast axis of the spiral wave plate 503; and situation 2: if the sample 900 to be detected responds optimally to a polarization parallel to the surface of the substrate 8, angular polarization or linear polarization is used. In this case, the polarizer 500 is adjusted so that the light beam polarization passing through a one-half wave plate (i.e., the half-wave plate 502) is perpendicular to the fast axis of the spiral wave plate 503.

An execution sequence of the above steps S1300, S1400, and S1500 is not limited.

Step S1600: focusing the collected sample signals from the region of nanoparticle or probe into the spectrometer 701.

In the above step S1200 to step S1600, after the polarization state, the excitation angle, and the coverage angle area are all determined, the optical imaging device 750 may operate, and the light path of the optical imaging device 750 during the operation is as follows: in this step, the second reflecting mirror 606 is located outside the light path. The diameter of the excitation light beam emitted by the laser device 200 is increased by the beam expander 300 to 2d. Subsequently, the beam changer 400 converts the light beam with the increased diameter into an annular light beam with a light beam wall thickness d and a light beam radius r. The polarizer 500 can control the polarization state of the annular light beam to switch between linear polarization and vector polarization, e.g., to switch to radial polarization. The third reflecting mirror 550 reflects the annularly polarized light beam to the objective lens 100, and then the light beam is focused on the surface of the substrate 8 at the excitation angle θ. In this case, the single nanoparticle 9 on the surface of the substrate 8 is located at the center of the focal point. In this case, the single nanoparticle 9 will enhance local electromagnetic field nearby, improve the excitation efficiency of sample molecules in the local field, and meanwhile amplify spectral signal of the molecules in the local field radiating to a far field. The spectral signal, after passing through the objective lens 100, is converted into a parallel light beam, which, after being transmitted through the third reflecting mirror 550, is filtered out the excitation light part thereof by the filter lens 703, and only the signal light part is left. Wavelengths of the signal light left, after being focused by the second focusing lens 702, enter the spectrometer 701 and are recorded.

Step S1700: analyzing a spectrogram collected by the spectrometer 701 to obtain chemical components of the sample.

In the detection method provided in the above technical solutions, the excitation angle θ and the excitation angle coverage area Δθ are respectively controlled by the beam expander 300 and the beam changer 400, and the excitation light polarization is controlled by the polarizer 500, therefore, the control over various vector polarized light fields such as any direction of linear polarization, angular polarization, and radial polarization at the focusing plane is realized.

Figure 23:
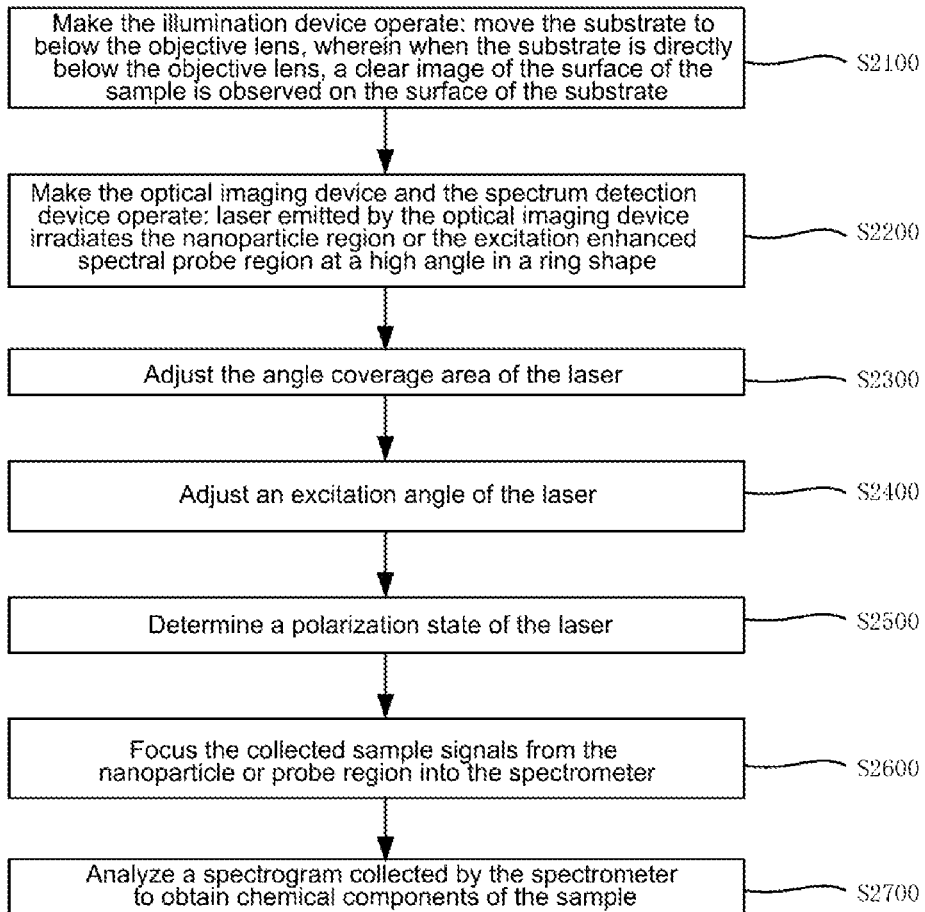
FIG. 23 is a schematic flow chart of a detection method in an annular vector polarized excitation total reflection mode provided in some other embodiments of the present disclosure.

With reference to FIG. 23, a second optical detection method, i.e., a detection method in an annular vector polarized excitation total reflection mode, is described below.

Before describing the detection method, an optical system on which the method is based will be described. The optical system on which the present detection method is based is substantially the same as the optical system used in FIG. 21a described above, with a difference that in the optical system on which the present detection method is based, the objective lens 100 thereof includes the total reflection lens 3. In other words, embodiments in which the objective lens 100 includes the total reflection lens 3 are all suitable for the annular vector polarized excitation total reflection mode. For a specific structure of the objective lens 100, reference is made to the above description about FIG. 3 to FIG. 4b.

With reference to FIG. 23, how to use the optical system provided in the present embodiment to realize the optical detection is described below.

Step S2100: making the white light illumination device 600 operate: moving the substrate 8 to below the objective lens 100, wherein when the substrate 8 is directly below the objective lens 100, a clear image of the surface of the sample can be observed on the surface of the substrate 8. For detailed description of the illumination device 600, reference is made to the above description, and it will not be repeated herein.

Step S2200: making the optical imaging device 750 and the spectrum detection device 700 operate, and in this case, the illumination device 600 no longer functioning. The laser emitted by the optical imaging device 750 will irradiate the region of the nanoparticles 9 or the region of the excitation enhanced spectral probe 12 at a high angle in a ring shape.

Step S2300: adjusting the angle coverage area of the laser. A beam expansion ratio is calculated according to a required radius of the laser light beam, and the beam expander 300 meeting the requirement of the beam expansion ratio is selected. For example, the radius of the laser light beam is 0.25 mm, and the beam expansion ratio of the beam expander 300 is 1.6, so that the output light beam has a radius of 0.4 mm.

Step S2400: adjusting an excitation angle of the laser. Specifically, by adjusting the position of the electric slide rail of the beam changer 400, the distance between the first axicon 401 and the second axicon 402 is changed, and the radius of the annular light beam is adjusted, further the excitation angle is adjusted, so that the excitation angle θ is larger than a total internal reflection critical angle.

The plane of the hemispherical prism coincides with the focal plane of the parabolic reflective objective lens 100, and the sphere center coincides with the focal point of the parabolic reflective lens. In this case, the excitation angle θ and the excitation angle coverage area Δθ are adjusted, so that the incident light is annularly focused at the region of the sphere center of the hemispherical prism. When excitation angle θ is greater than the total internal reflection critical angle, total reflection occurs in the region of the sphere center of the hemispherical prism, generating evanescent waves on an air side of the region of the sphere center. The nanoparticles 9 and the enhanced spectral probe in the evanescent wave range can enhance the local electromagnetic field intensity, and improve the excitation efficiency of sample molecules in the local field. The higher the excitation efficiency is, the more the energies of excitation light are coupled with the sample, thus improving the detection sensitivity of the device.

In some embodiments, in the detection method described in the present embodiment, the total reflection lens 3 (i.e. the structure described in FIG. 6a and FIG. 6b) having the first metal layer and the two-dimensional material film layer on the surface is selected. Compared with the solution in which only the total reflection lens 3 is provided, the laser will first excite surface electromagnetic waves on the surface of the first metal layer or the two-dimensional material film layer. In this case, the laser energies will be further concentrated on the surface of material such as a precious metal as the first metal layer or graphene as the two-dimensional material film layer, and at this point, evanescent waves with stronger strength and faster attenuation are generated on the surface of the first metal layer or the two-dimensional material film layer due to the generation of surface electromagnetic waves, which further improves the local electromagnetic field intensity of the nanoparticles 9 and enhanced spectral probe in the evanescent wave range, so as to obtain higher excitation efficiency. The excitation efficiency can be increased by several times or even tens of times compared with the solution in which only the total reflection lens 3 is provided.

Step S2500, determining a polarization state of the laser, and adjusting the polarizer 500 to make the light satisfy a required polarization state.

Specifically, according to properties and target characteristics of the sample 900 to be detected, the following configurations are making respectively:

situation 1: if the sample responds optimally to polarization perpendicular to the surface of the substrate 8, radial polarization is used. In this case, the polarizer 500 is adjusted so that a linear polarization direction of the light beam passing through the half-wave plate (i.e., the half-wave plate 502) coincides with the fast axis of the spiral wave plate 503; and situation 2: if the sample responds optimally to polarization parallel to the surface of the substrate 8, angular polarization is used. In this case, the polarizer 500 is adjusted so that a linear polarization direction of the light beam passing through a one-half wave plate (i.e., the half-wave plate 502) is perpendicular to the fast axis of the spiral wave plate 503.

An execution sequence of the above steps S2300, S2400, and S2500 is not limited.

Step S2600: collecting sample signals from the region of particle or probe and then focusing the same into the spectrometer 701.

Step S2700, analyzing a spectrogram collected by the spectrometer 701 to obtain chemical components of the sample.

As can be seen from the detection process described above, the general process of optical detection is the same regardless of whether the total reflection lens 3 is provided, but the excitation angle and the polarization state may be different.

Referring to FIG. 24, in various embodiments in which an enhancement layer 4, that is, a first metal layer or a two-dimensional material film layer, is provided on the surface of the total reflection lens 3 described in the above, i.e., the structure described in FIG. 7a and FIG. 7b, a third optical detection, i.e., an optical detection in an annular vector polarized excitation KR-SPP mode can be realized. The KR-SPP mode refers to: a detection mode for implementing the optical detection principle of excited surface plasmon proposed by Kretschmann. The optical system used in this detection mode is an optical system corresponding to FIG. 21a. Reference is made to the description in the above for specific contents.

In this detection method, a metal or two-dimensional material thin film that supports surface plasmon (i.e., SPP) is prepared on the surface of the substrate 8, and the sample is placed on the thin film. A lower surface of the substrate 8 is attached to the hemispherical prism through a refractive index coupling liquid. In this case, a clear image of the sample on the surface of the substrate 8 can be directly observed.

Referring to FIG. 24, a specific detection method is substantially the same as the detection method described above, specifically including the following steps:

step S3100: making a white light illumination device 600 operate until a clear image of the surface of the sample is observed on the surface of the substrate 8. For the detailed description of the illumination device 600, reference is made to the above description, and it will not be repeated herein.

Step S3200: making the optical imaging device 750 and the spectrum detection device 700 operate, and in this case, the illumination device 600 no longer functioning.

Step S3300: adjusting an excitation angle of the laser, so that the excitation angle reaches an SPP excitation angle. Specifically, by adjusting the position of the electric slide rail of the beam changer 400, the distance between the first axicon 401 and the second axicon 402 is changed, the radius of the annular light beam is adjusted, and the excitation angle is further adjusted, so that the excitation angle reaches an SPP excitation angle.

Step S3400: determining a polarization state of the laser, and adjusting the polarizer 500 to make the light satisfy a required polarization state.

In this mode, the sample responds optimally to polarization perpendicular to the surface of the substrate 8, therefore, radial polarization is used. In this case, the polarizer 500 is adjusted so that a linear polarization direction of the light beam passing through the one-half wave plate (i.e., the half-wave plate 502) coincides with the fast axis of the spiral wave plate 503.

An execution sequence of the above step S3300 and step S3400 is not limited.

Step S3500: collecting scattered light signals of the sample from the particle or probe region and then focusing the same into the spectrometer 701.

Step S3600: analyzing a spectrogram collected by the spectrometer 701 to obtain chemical components of the sample 900.

The above-described detection method is particularly suitable for detection of ultra-thin samples such as unimolecules and unimolecular layers.

Figure 25:
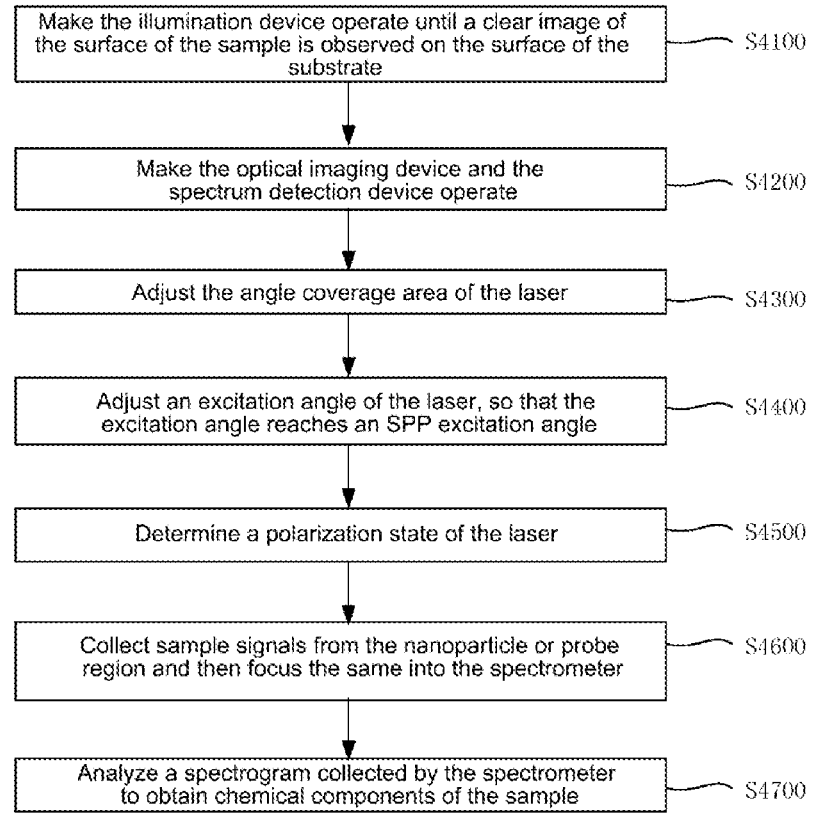
FIG. 25 is a schematic flow chart of a detection method in an annular vector polarized excitation Otto-SPP mode provided in some other embodiments of the present disclosure.

Referring to FIG. 25, it is described below how various embodiments, in which micro-nanospheres 10 are provided between the total reflection lens 3 and the substrate 8, realize fourth optical detection, i.e., an optical detection in an annular vector polarized excitation Otto-SPP mode. The optical system used in this detection mode is an optical system corresponding to FIG. 21a. Reference is made to the above description for specific contents.

The Otto-SPP mode refers to a detection mode for implementing the optical detection principle of excited surface plasmon proposed by Otto. In the optical system on which this detection method is based, there is a distance between the substrate 8 thereof and the focal plane, i.e., reference can be made to the above structure described about FIG. 7a, FIG. 7b, FIG. 14a, and FIG. 14b for the structure of the objective lens 100 used in this optical system. The excitation efficiency of this mode is also far higher than that of the microscopic objective lens 800 in the related art. In those technical solutions in which a parabolic reflecting mirror is used, the annular excitation light is totally reflected on the surface of the hemispherical prism, and the upper surface of the substrate 8 is located within the range of the evanescent field. The micro-nanospheres 10 control the spacing between the total reflection lens 3 and the substrate 8, and the molecules to be detected are located in a focusing region of the annular excitation light. In the above, the enhancement layer 4, i.e., the first metal layer or the two-dimensional material film layer, is deposited on the surface of the substrate 8, as shown in FIG. 16a and FIG. 16b. When an excitation light angle satisfies a surface plasmon excitation condition, the local electromagnetic field intensity in the sample region on the surface of the substrate 8 can be further improved, and higher excitation efficiency can be obtained.

With reference to FIG. 25, the optical detection method in the annular vector polarized excitation Otto-SPP mode includes the following steps:

step S4100: making a white light illumination device 600 operate until a clear image of the surface of the sample is observed on the surface of the substrate 8. For the detailed description of the illumination device 600, reference is made to the above description, and it will not be repeated herein.

Step S4200: making the optical imaging device 750 and the spectrum detection device 700 operate, and in this case, the illumination device 600 no longer functioning.

Step S4300: adjusting the angle coverage area of the laser. A beam expansion ratio is calculated according to a required radius of the laser light beam, and the beam expander 300 meeting the requirement of the beam expansion ratio is selected. For example, the radius of the laser light beam is 0.25 mm, and the beam expansion ratio of the beam expander 300 is 1.6, so that the output light beam has a radius of 0.4 mm.

Step S4400: adjusting an excitation angle of the laser. Specifically, by adjusting the position of the electric slide rail of the beam changer 400, the distance between the first axicon 401 and the second axicon 402 is changed, and the radius of the annular light beam is adjusted, and further the excitation angle is adjusted, so that the excitation angle reaches an SPP excitation angle.

Step S4500: determining a polarization state of the laser, and adjusting the polarizer 500 to make the light satisfy a required polarization state.

In this mode, the sample responds optimally to polarization perpendicular to the surface of the substrate 8, thus radial polarization is used. In this case, the polarizer 500 is adjusted so that a linear polarization direction of the light beam passing through the one-half wave plate (i.e., the half-wave plate 502) coincides with the fast axis of the spiral wave plate 503.

Step S4600: collecting sample signals from the region of nanoparticle 9 or excitation enhanced spectral probe 12 and then focusing the same into the spectrometer 701.

Step S4700: analyzing a spectrogram collected by the spectrometer 701 to obtain chemical components of the sample.

The optical detection method in the annular vector polarized excitation Otto-SPP mode is particularly suitable for detection of ultra-thin samples such as unimolecules and unimolecular layers. The spectrum detection has higher sensitivity, and can reach the detection sensitivity of single molecule.

Figure 26A:
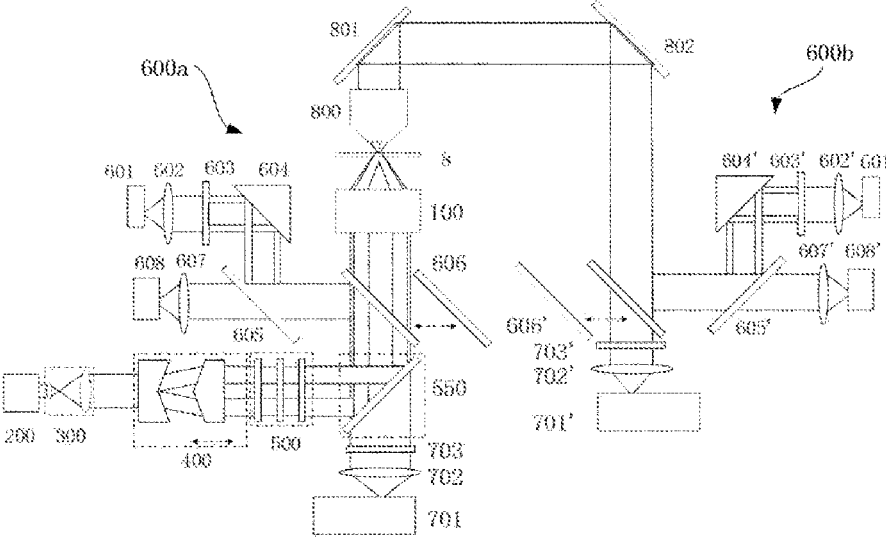
FIG. 26a is a schematic diagram of principle of an optical system realizing an annular vector polarized excitation planar waveguide mode provided in some other embodiments of the present disclosure.
Figure 26B:
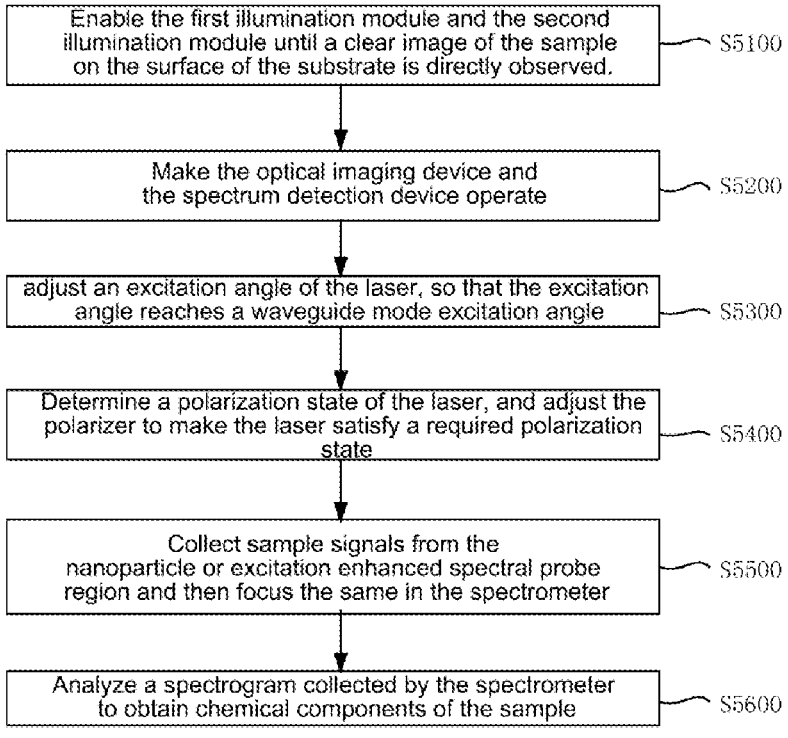
FIG. 26b is a schematic flow chart of an optical detection method in an annular vector polarized excitation planar waveguide mode provided in some other embodiments of the present disclosure.

Referring to FIG. 26a and FIG. 26b, optical detection in the annular vector polarized excitation planar waveguide mode is described below. Reference is made to the description of FIG. 8a and FIG. 8b for the objective lens 100 shown in this detection mode.

The optical system structure on which this detection mode is based will be described first.

Referring to FIG. 26a, the optical system thereof includes two illumination devices 600, one imaging device, and two spectrum detection devices 700. The two illumination devices 600 are a first illumination device 600a and a second illumination device 600b, respectively. The two spectrum detection devices 700 are a first spectrum detection device 700a and a second spectrum detection device 700b, respectively. The first illumination device 600a, the first spectrum detection device 700a, and the optical imaging device 750 form a whole and cooperate with each other. The second illumination device 600b, the second spectrum detection device 700b, and the microscopic objective lens 800 form a whole and cooperate with each other. The optical imaging device 750 coincides with a focal point of the microscopic objective lens 800 coincide.

The first illumination device 600a has the same structure and function as the illumination device 600 described above with respect to the respective optical systems. The second illumination device 600b is of a structure substantially the same as that of the illumination device 600 described above, except that it is used to illuminate the microscopic objective lens 800. See the above for the structure and positional relationship between components of the first illumination device 600a, which will not be repeated herein. Only the second illumination device 600b is described.

Referring to FIG. 26a, the second illumination device 600b includes a visible light source 601', a lens 602', and an annular baffle 603'. The visible light source 601' is configured to emit visible light; the lens 602' is arranged between the visible light source 601' and the microscopic objective lens 800; and the annular baffle 603 is arranged between the lens 602' and the microscopic objective lens 800.

Referring to FIG. 26a, the second illumination device 600b further includes a first reflecting mirror 604', a semi-reflective and semi-transmissive lens 605', and a second reflecting mirror 606'. The first reflecting mirror 604' is arranged between the annular baffle 603' and the microscopic objective lens 800. The semi-reflective and semi-transmissive lens 605' is arranged in parallel with a reflecting surface of the first reflecting mirror 604'. The second reflecting mirror 606' is movably arranged between the spectrometer 701 and the microscopic objective lens 800, and the second reflecting mirror 606' is configured to switch between two positions as follows: being located on a light path between the spectrometer 701 and the microscopic objective lens 800 to reflect light from the visible light source 601' into the microscopic objective lens 100; and being located outside the light path between the microscopic objective lens 800 and the spectrometer 701, so as not to hinder the propagation of light between the microscopic objective lens 800 and the spectrometer 701. The first focusing mirror 607' is located on a side of the semi-reflective and semi-transmissive lens 605' away from the second reflecting mirror 606'; and the imaging sensor 608' is located on a side of the first focusing mirror 607' away from the semi-reflective and semi-transmissive lens 605'.

With continued reference to FIG. 26*a*, the microscopic objective lens 800 is provided with a fourth reflecting mirror 801 and a fifth reflecting mirror 802 configured to change a direction of light. In this detection mode, the surface of the substrate 8 of the objective lens 100 is provided with a waveguide material layer 6, and the sample 900 to be detected is provided on the waveguide material layer 6. A lower surface of the substrate 8 is attached to the hemispherical prism through a refractive index coupling liquid.

The optical detection method in the annular vector polarized excitation planar waveguide mode includes the following steps:

step S5100: enabling the first illumination device 600*a* and the second illumination device 600*b* until a clear image of the sample on the surface of the substrate 8 is directly observed.

Specific operation steps are: moving the second reflecting mirrors 606 and 606' both into the light path, and adjusting the objective lens 100 and the microscopic objective lens 800, so that the surface of the substrate 8 can be seen clearly on both the imaging sensors 608 and 608'.

Step S5200: making the optical imaging device 750 and the spectrum detection device 700 operate, and in this case, the illumination device 600 no longer functioning.

Specifically, the second reflecting mirrors 606 and 606' are both moved out of the light path, and in this case, the laser radiated from the laser device 200, after being expanded and shaped, is focused on the surface of the substrate 8 at a certain angle.

Step S5300: adjusting an excitation angle of the laser. Specifically, by adjusting a position of the electric slide rail of the beam changer 400, the distance between the first axicon 401 and the second axicon 402 is changed, the radius of the annular light beam is adjusted, and further the excitation angle is adjusted, so that the excitation angle reaches the waveguide mode excitation angle.

When the excitation light angle θ satisfies the excitation condition of the waveguide medium layer 62, an evanescent field is generated on the surface of the waveguide medium layer 62, and the local electromagnetic field of the nanoparticles 9 or the enhanced spectral probe located within the range of the evanescent field is further improved, further improving the excitation efficiency of the spectrum.

Step S5400: determining a polarization state of the laser, and adjusting the polarizer 500 to make the laser satisfy a required polarization state.

Specifically, according to properties and target characteristics of the sample 900 to be detected, the following configurations are made respectively:

situation 1: if the sample responds optimally to polarization perpendicular to the surface of the substrate 8, radial polarization is used. In this case, the polarizer 500 is adjusted so that a linear polarization direction of the light beam passing through the one-half wave plate (i.e., the half-wave plate 502) coincides with the fast axis of the spiral wave plate 503; and situation 2: if the sample responds optimally to polarization parallel to the surface of the substrate 8, angular polarization or linear polarization is used. In this case, the polarizer 500 is adjusted so that a linear polarization direction of the light beam passing through the one-half wave plate (i.e., the half-wave plate 502) coincides with the fast axis of the spiral wave plate 503.

Through the adjustments in step S5300 and step S5400, the excitation angle and the polarization state of the laser are further enabled to meet the waveguide excitation condition.

Step S5500: collecting sample signals from the region of nanoparticle 9 or excitation enhanced spectral probe 12 and then focusing the same into the spectrometer 701. Spectral signals originated from the substrate 8 are recorded by the spectrometer 701 after passing through the objective lens 100 and subsequent light path. Meanwhile, another other part of spectral signals originated from the substrate 8 are recorded by the spectrometer 701' after passing through the microscopic objective lens 800 and subsequent light path.

Step S5600: analyzing a spectrogram collected by the spectrometers 701 and 701' to obtain chemical components of the sample.

In the above optical detection method, the amount of samples may be very small, more excitation angles are supported, and more polarization modes are supported, therefore, it has wider application scenarios.

Figure 27A:
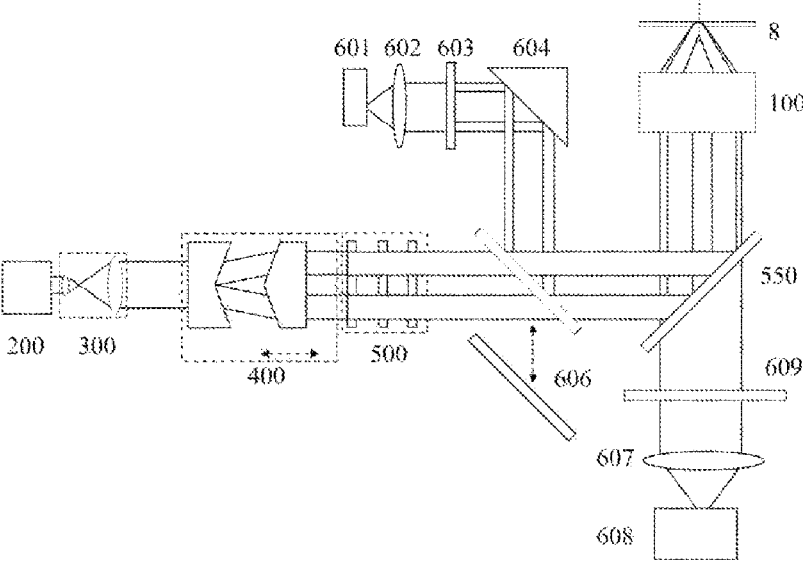
FIG. 27a is a schematic diagram of principle of an optical system realizing an annular vector polarized excitation optical sectioning microscope mode provided in some other embodiments of the present disclosure.

Referring to FIG. 27*a* and FIG. 27*b*, optical detection in an annular vector polarized excitation optical sectioning microscope mode is described below. Reference is made to the contents described about FIG. 8*a* and FIG. 8*b* in the above for the objective lens 100 shown in this detection mode.

In this mode, the optical system includes the illumination device 600 and the optical imaging device 750. Referring to FIG. 27*a*, the illumination device 600 is configured to provide visible illumination light. In the above, the illumination device 600 includes a visible light source 601, a lens 602, an annular baffle 603, a first reflecting mirror 604, a second reflecting mirror 606, a first focusing mirror 607, an imaging sensor 608, and a fluorescent microscope 609. The visible light source 601 is configured to emit visible light. The lens 602 is arranged between the visible light source 601 and the objective lens 100. The annular baffle 603 is arranged between the lens 602 and the objective lens 100. The first reflecting mirror 604 is arranged between the annular baffle 603 and the objective lens 100. The second reflecting mirror 606 is movably arranged between the first reflecting mirror 604 and the objective lens 100, and the second reflecting mirror 606 is configured to switch between two positions as follows: being located on a light path between the first reflecting mirror 604 and the objective lens 100 to reflect light to the third reflecting mirror 550 of the optical imaging device 750; and being located outside the light path between the polarizer 500 of the optical imaging device 750 and the objective lens 100, so as not to avoid blocking the light output by the polarizer 500 from reaching to the third reflecting mirror 550. The fluorescent microscope 609 is arranged on a side of the third reflecting mirror 550 away from the objective lens 100. The first focusing mirror 607 is located on a side of the fluorescent microscope 609 away from the third reflecting mirror 550. The imaging sensor 608 is located on a side of the first focusing mirror 607 away from the fluorescent microscope 609.

How to use the optical system provided in the present embodiment to realize the optical detection is described below.

Step S6100: making the white light illumination device 600 operate, i.e., the illumination device 600 functioning: moving the substrate 8 to below the objective lens 100, wherein when the substrate 8 is directly below the objective lens 100, a clear image of the surface of the sample can be observed on the surface of the substrate 8. Specific operation steps are as follows: the second reflecting mirror 606 is moved into the light path, the visible light source 601 emits broadband white light, which is changed into parallel light after passing through the lens 602, then changed into annular light after passing through the annular baffle 603, after that, it is reflected by the first reflecting mirror 604, then reflected by the second reflecting mirror 606 and the third reflecting mirror 550, entering the objective lens 100, and finally forming a light spot on the substrate 8. The position of the sample or the objective lens 100 is moved until the sample 900 is seen clearly.

Step S6200: adjusting the optical system so that the optical imaging device 750 and the spectrum detection device 700 both operate, in this case, the illumination device 600 no longer functioning. In this case, the second reflecting mirror 606 is moved out of the light path.

Step S6300: adjusting an excitation angle. Specifically, by adjusting a position of the electric slide rail of the beam changer 400, the distance between the first axicon 401 and the second axicon 402 is changed, the radius of the annular light beam is adjusted, and further the excitation angle is adjusted, so that the excitation angle reaches the maximum excitation angle tolerable by the objective lens 100.

Step S6400: using the optical imaging device 750 for illumination, i.e., laser illumination.

Step S6500: adjusting and controlling the polarization state of the laser to switch between the radial polarization and the angular polarization, so as to obtain fluorescent imaging of the sample in each polarization state.

Specifically, according to properties and target characteristics of the sample 900 to be detected, the following configurations are made respectively:

situation 1: if the sample responds optimally to polarization perpendicular to the surface of the substrate 8, radial polarization is used. In this case, the polarizer 500 is adjusted so that a linear polarization direction of the light beam passing through the one-half wave plate (i.e., the half-wave plate 502) coincides with the fast axis of the spiral wave plate 503; and situation 2: if the sample responds optimally to polarization parallel to the surface of the substrate 8, angular polarization is used. In this case, the polarizer 500 is adjusted so that a linear polarization direction of the light beam passing through the one-half wave plate (i.e., the half-wave plate 502) is perpendicular to the fast axis of the spiral wave plate 503.

Step S6600: comparing imaging of the sample 900 in different polarization states, and analyzing an internal structure of the sample 900.

Figure 28B:
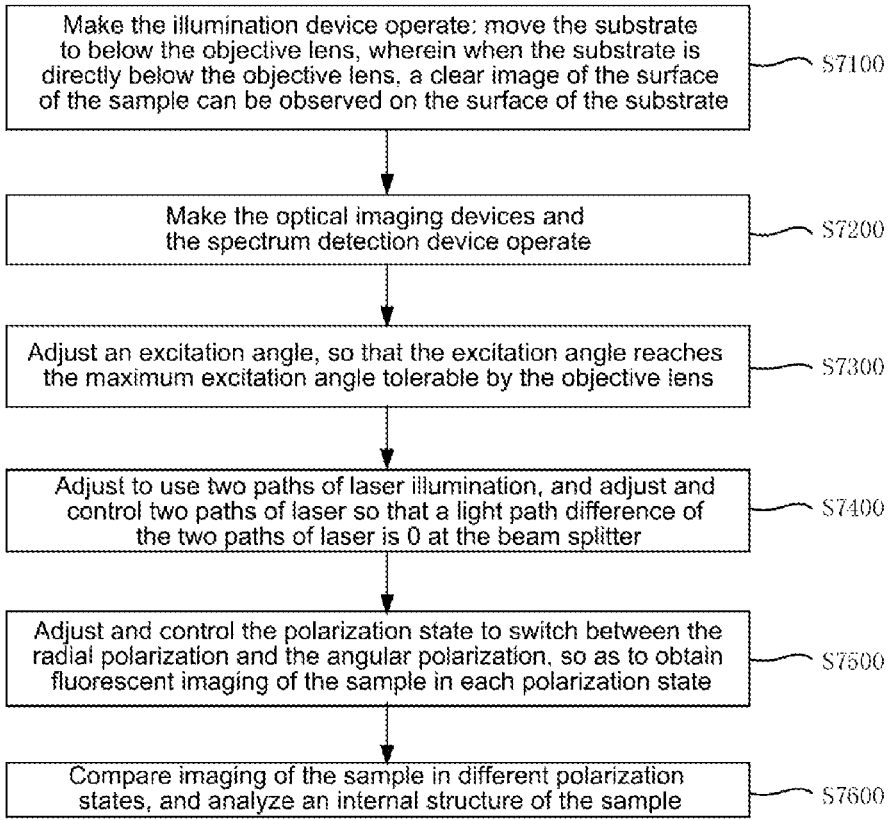
FIG. 28b is a schematic flow chart of an optical detection method in an annular vector polarized excitation optical sectioning microscope mode provided in some other embodiments of the present disclosure.

Referring to FIG. 28*a* and FIG. 28*b*, optical detection in the annular vector polarized excitation optical sectioning microscope mode is described below.

Reference is made to the description of FIG. 8 in the above for the objective lens 100 shown in this detection mode.

In this mode, there is a further set of optical imaging device 750 in the optical system on the basis of the optical system described above with reference to FIG. 27*a*. That is, the optical system provided in the present embodiment includes one illumination device 600, two optical imaging devices 750, and one spectrum detection device 700. The two imaging devices realize light convergence into one path by means of a beam combiner 1000. The focal points of the two sets of optical imaging devices 750 coincide; and at least one set of the optical imaging devices 750 is mounted to a delay line 2000, so that a light path difference of laser emitted by the two sets of optical imaging devices 750 can be adjusted.

Referring to FIG. 28*a* and FIG. 28*b*, the optical sectioning microscope includes two paths of excitation light, and focal points of the two paths of excitation light are located at the same point. The two paths of excitation light are combined by the beam combiner 1000. That is, laser emitted from the objective lens 100, the laser device 200, the beam expander 300, the beam changer 400, and the polarizer 500 and laser emitted from the objective lens 100', the laser device 200', the beam expander 300', the beam changer 400', and the polarizer 500' pass through the beam combiner 1000 and then are transmitted to the objective lens 100.

How to use the optical system provided in the present embodiment to implement optical detection is introduced below.

Step S7100: making the white light illumination device 600 operate, i.e., the illumination device 600 functioning: moving the substrate 8 to below the objective lens 100, wherein when the substrate 8 is directly below the objective lens 100, a clear image of the surface of the sample can be observed on the surface of the substrate 8. For the illumination device 600, specific operation steps are as follows: moving the second reflecting mirror 606 into the light path, the visible light source 601 emits broadband white light, which is changed into parallel light after passing through the lens 602, then changed into annular light after passing through the annular baffle 603, after that, it is reflected by the first reflecting mirror 604, then reflected by the second reflecting mirror 606 and the third reflecting mirror 550, and entering the objective lens 100. The position of the sample or the objective lens 100 is moved until the sample is seen clearly.

Step S7200: making the two optical imaging devices 750 and the spectrum detection device 700 both operate, and in this case, the illumination device 600 no longer functioning. In this case, the second reflecting mirror 606 is moved out of the light path.

Step S7300: adjusting excitation angles of respective lasers. Specifically, by adjusting the position of the electric slide rail of the beam changer 400, the distance between the first axicon 401 and the second axicon 402 is changed, the radius of the annular light beam is adjusted, and further the excitation angle is adjusted, so that the excitation angle reaches the maximum excitation angle tolerable by the objective lens 100.

Step S7400: using two paths of laser to illuminate. Relative positions of the two paths of laser are adjusted so that the light path difference is 0 when the two paths of light are combined at the beam combiner 1000.

Step S7500: adjusting and controlling the polarization state to switch between the radial polarization and the angular polarization, to obtain fluorescent imaging of the sample in each polarization state.

Specifically, according to properties and target characteristics of the sample 900 to be detected, the following configurations are made respectively:

situation 1: if the sample responds optimally to polarization perpendicular to the surface of the substrate 8, radial polarization is used. In this case, the polarizer 500 is adjusted so that a linear polarization direction of the light beam passing through the one-half wave plate (i.e., the half-wave plate 502) coincides with the fast axis of the spiral wave plate 503; and situation 2: if the sample responds optimally to polarization parallel to the surface of the substrate 8, angular polarization or linear polarization is used. In this case, the polarizer 500 is adjusted so that a linear polarization direction of the light beam passing through a one-half wave plate (i.e., the half-wave plate 502) is perpendicular to the fast axis of the spiral wave plate 503.

Specific operations of step S7300-step S7500 are as follows: at this time, the second reflecting mirror 660 has been moved out of the light path. The two laser devices 200 and 200' respectively emit laser. The two paths of laser, after being adjusted in the light beam and the polarization state, are combined at the beam combiner 1000, and the combined laser is reflected by the third reflecting mirror 550 and enters the objective lens 100, then it is focused on the substrate 8. A delayer 2000 is adjusted, a light path difference between a left optical arm and a lower optical arm at the beam combiner 1000 is moved, wherein when the light path difference between the two is 0, two-photon coupling will be generated in the sample at the substrate 8, and fluorescence photons radiated from the sample, after passing through the objective lens 100, the dichroscope 550a, and the fluorescence filter 609, are focused on the imaging sensor 608 by an imaging lens 607. In the above imaging process, by performing the adjustments in step S7300-step S7500, different imaging effects can be obtained.

Step S7600: comparing imaging of the sample 900 in different polarization states, and analyzing an internal structure of the sample 900.

The optical detection in the annular vector polarized excitation optical sectioning microscope mode mainly aims at life science samples such as cells and tissues.

The optical system provided in various technical solutions above limits the energy of excitation light within a range of 1-degree excitation angle, and significantly improves the light energy excitation efficiency; moreover, the excitation angle is adjustable in 0-80 degrees, which fully satisfies the requirements of the samples on the excitation angle; the polarization state is flexibly adjustable, which fully satisfies the requirements of the samples on the excitation polarization; moreover, this optical system realizes that the angle control capability achieved by the conventional large and complex corner device is reduced to the integrated optical imaging device 750, simplifies the structure of the device, and can be combined with existing microscopic spectrum systems or develop portable spectrum devices.

In the description of the present disclosure, it should be understood that orientation or positional relations indicated by terms such as "center", "longitudinal", "transverse", "front", "rear", "left", "right", "vertical", "horizontal", "top", "bottom", "inner", and "outer" are based on orientation or positional relations as shown in the accompanying drawings, merely for facilitating the description of the present disclosure and simplifying the description, rather than indicating or implying that related devices or elements have to be in the specific orientation or be configured and operated in a specific orientation, therefore, they should not be construed as limitation on the scope of protection of the present disclosure.

Finally, it should be explained that the above embodiments are merely used for illustrating the technical solutions of the present disclosure, rather than limiting the present disclosure; although the detailed description is made to the present disclosure with reference to preferred embodiments, those ordinarily skilled in the art should understand that they still could modify the embodiments of the present disclosure or make equivalent substitutions to some of the technical features therein; and these modifications or substitutions, without departing from the spirit of the technical solution of the present disclosure, should be all covered within the scope of the technical solutions claimed in the present disclosure.

What is claimed is:

1. An objective lens, comprising:
a housing (1), having an inner cavity (11), wherein the inner cavity (11) is provided with a first opening (11a) and a second opening (11b); and
an optical focusing assembly (2), mounted in the inner cavity (11), wherein a focal point of the optical focusing assembly (2) is located at the second opening (11b), and the optical focusing assembly (2) is configured to focus light entering the housing (1) through the first opening (11a) on the focal point,
wherein the optical focusing assembly (2) comprises:
a lens group (21), comprising at least two lenses, wherein an excitation light, after passing through the lenses, is focused on a same point outside the housing (1); and alternatively, the excitation light, after passing through the respective lenses, is focused on a same point on a plane where the second opening (11b) is located.

2. The objective lens according to claim 1, wherein the respective lenses of the lens group (21) are arranged in a row, wherein all of concave surfaces of the respective lenses face a side where the focal point is located, and refractive indexes of the respective lenses, along a direction toward the focal point, are gradually increased.

3. The objective lens according to claim 1, wherein the lens group (21) has at least one lens in which at least one of a concave surface and a convex surface is a quadratic curved surface.

4. The objective lens according to claim 1, wherein the optical focusing assembly (2) comprises:
a metal plate, comprising a cambered surface, wherein the metal plate is integrated with the housing (1).

5. The objective lens according to claim 1, further comprising:
a total reflection lens (3), mounted to the housing (1), wherein a sphere center of the total reflection lens (3) is located at the focal point of the optical focusing assembly (2).

6. The objective lens according to claim 5, wherein the total reflection lens (3) comprises a hemispheric prism, a convex surface of the hemispherical prism is away from a side where the focal point is located, and a plane of the hemispherical prism faces the side where the focal point is located, and a plane of the total reflection lens (3) is provided with an enhancement layer (4) configured to excite a surface electromagnetic wave mode.

7. The objective lens according to claim 6, wherein the enhancement layer (4) comprises a first metal layer deposited on the plane of the total reflection lens (3) or a two-dimensional material film layer prepared on the plane of the total reflection lens (3).

8. The objective lens according to claim 7, wherein
a material of the first metal layer is selected from one or more of the group consisting of: gold, silver, copper, platinum, and palladium; and
alternatively, a material of the two-dimensional material film layer is selected from one or more of the group consisting of: graphene, boron nitride, a transition metal chalcogenide, and a heterojunction composed of a transition metal chalcogenide.

9. The objective lens according to of claim 5, wherein the total reflection lens (3) comprises a hemispherical prism, a convex surface of the hemispherical prism is away from a side where the focal point is located, a plane of the hemispherical prism faces the side where the focal point is located, and a semi-reflective and semi-transmissive film layer (5) is deposited on a plane of the total reflection lens (3), wherein the semi-reflective and semi-transmissive film layer (5) is configured to make a part of light reflected and make the remaining light transmitted, so as to form a surface total reflection on a surface of the semi-reflective and semi-transmissive film layer (5) away from the housing (1).

10. The objective lens according to claim 9, wherein a material of the semi-reflective and semi-transmissive film layer (5) is selected from one or more of the group consisting of: gold, silver, copper, aluminum, iron, platinum, palladium, and rhodium.

11. The objective lens according to claim 5, wherein the total reflection lens (3) is a hemispherical prism, a convex surface of the hemispherical prism is away from a side where the focal point is located, a plane of the hemispherical prism faces the side where the focal point is located, and a waveguide material layer (6) is deposited on a plane of the total reflection lens (3).

12. The objective lens according to claim 11, wherein the waveguide material layer (6) comprises:

a second metal layer (61), deposited on the plane of the hemispherical prism; and a waveguide medium layer (62), deposited on a surface of the second metal layer (61) away from the hemispherical prism.

13. The objective lens according to claim 5, further comprising:

a bracket (7), wherein the bracket (7) is fixedly connected to the housing (1), and the total reflection lens (3) is mounted to the housing (1) through the bracket (7).

14. The objective lens according to claim 5, wherein the total reflection lens (3) comprises:

a first lens portion (31), fixedly or detachably connected to the housing (1); and a second lens portion (32), detachably connected to the first lens portion (31), wherein a surface of the second lens portion (32) away from the first lens portion (31) is configured to support a sample.

15. An optical imaging device, comprising the objective lens (100) according to claim 1.

16. The optical imaging device according to claim 15, further comprising:

a substrate (8), provided outside the housing (1), wherein the substrate (8) is configured to dispose a sample (900) to be detected.

17. An optical system, comprising the optical imaging device according to claim 5.

18. The optical system according to claim 17, further comprising:

an illumination device (600), configured to provide visible illumination light; and/or a spectrum detection device (700), configured to collect scattered light of the sample (900) under a laser excitation and analyze the scattered light.

* * * * *